(12) United States Patent
Qiu et al.

(10) Patent No.: US 11,385,478 B2
(45) Date of Patent: Jul. 12, 2022

(54) PROCESS FOR PRODUCING CONTACT LENSES WITH DURABLE LUBRICIOUS COATINGS THEREON

(71) Applicant: Novartis AG, Basel (CH)

(72) Inventors: Yongxing Qiu, Suwanee, GA (US); John Dallas Pruitt, Suwanee, GA (US); Kelly Kayi Tallau, Johns Creek, GA (US); Angela Driver-Scott, Atlanta, GA (US); Chung-Yuan Chiang, Johns Creek, GA (US)

(73) Assignee: Alcon Inc., Fribourg (CH)

( * ) Notice: Subject to any disclaimer, the term of this patent is extended or adjusted under 35 U.S.C. 154(b) by 401 days.

(21) Appl. No.: 15/704,233

(22) Filed: Sep. 14, 2017

(65) Prior Publication Data

US 2018/0081197 A1    Mar. 22, 2018

Related U.S. Application Data

(60) Provisional application No. 62/396,847, filed on Sep. 20, 2016.

(51) Int. Cl.
| | |
|---|---|
| *G02C 7/04* | (2006.01) |
| *B29D 11/00* | (2006.01) |
| *G02B 1/14* | (2015.01) |
| *C09D 133/02* | (2006.01) |
| *C09D 177/06* | (2006.01) |
| *G02B 1/04* | (2006.01) |

(52) U.S. Cl.
CPC .......... *G02C 7/04* (2013.01); *B29D 11/00038* (2013.01); *B29D 11/00067* (2013.01); *C09D 133/02* (2013.01); *C09D 177/06* (2013.01); *G02B 1/043* (2013.01); *G02B 1/14* (2015.01); *B29D 11/00903* (2013.01); *G02C 2202/16* (2013.01)

(58) Field of Classification Search
CPC ................. G02C 7/04; G02C 2202/16; B29D 11/00067; B29D 11/00038; B29D 11/00903; G02B 1/043; G02B 1/14; C09D 177/06; C09D 133/02
USPC ........... 427/162–169, 248.1–255.7, 569–579
See application file for complete search history.

(56) References Cited

U.S. PATENT DOCUMENTS

| | | | |
|---|---|---|---|
| 3,408,429 A | 10/1968 | Wichterle | |
| 4,136,250 A | 1/1979 | Mueller et al. | |
| 4,143,949 A | 3/1979 | Chen | |
| 4,153,641 A | 5/1979 | Deichert et al. | |
| 4,182,822 A | 1/1980 | Chang | |
| 4,189,546 A | 2/1980 | Deichert et al. | |
| 4,254,248 A | 3/1981 | Friends et al. | |
| 4,259,467 A | 3/1981 | Keogh et al. | |
| 4,260,725 A | 4/1981 | Keogh et al. | |
| 4,261,875 A | 4/1981 | Leboeuf | |
| 4,276,402 A | 6/1981 | Chromecek et al. | |
| 4,312,575 A | 1/1982 | Peyman et al. | |
| 4,327,203 A | 4/1982 | Deichert et al. | |
| 4,341,889 A | 7/1982 | Deichert et al. | |
| 4,343,927 A | 8/1982 | Chang | |
| 4,347,198 A | 8/1982 | Ohkada et al. | |
| 4,355,147 A | 10/1982 | Deichert et al. | |
| 4,444,711 A | 4/1984 | Schad | |
| 4,460,534 A | 7/1984 | Boehm et al. | |
| 4,486,577 A | 12/1984 | Mueller et al. | |
| 4,543,398 A | 9/1985 | Bany et al. | |
| 4,605,712 A | 8/1986 | Mueller et al. | |
| 4,661,575 A | 4/1987 | Tom | |
| 4,684,538 A | 8/1987 | Klemarczyk | |
| 4,703,097 A | 10/1987 | Wingler et al. | |

(Continued)

FOREIGN PATENT DOCUMENTS

| | | |
|---|---|---|
| EP | 1465931 B1 | 8/2007 |
| WO | 2016/145204 A1 | 9/2016 |

OTHER PUBLICATIONS

Lopez-Alemany ("Porous Structure of Purevision™ versus Focus® Night&Day™ and Conventional Hydrogel Contact Lenses", Lopez-Alemany et al, J Biomed Mater Res. 2002;63(3):319-25, accessed online Nov. 20, 2019) (Year: 2002).*

R. Hartmann Plasma polymerisation: Grundlagen, Technik und Anwendung, Jahrbuch Oberflächentechnik Band (1993) 49, pp. 283-296, Battelle-Inst. e.V. Frankfurt/Main Germany.

H. Yasuda, "Glow Discharge Polymerization", Journal of Polymer Science: Macromolecular Reviews, vol. 16 (1981), pp. 199-293.

(Continued)

*Primary Examiner* — Michael B Cleveland
*Assistant Examiner* — Michael G Miller
(74) *Attorney, Agent, or Firm* — Jian Zhou

(57) ABSTRACT

The invention is related to a method for producing soft contact lenses comprises a silicone hydrogel lens body and a composite coating thereon. The composite coating comprises: a plasma base coating which is chemically-attached directly onto the surface of the silicone hydrogel contact lens and functions as a fail-proof measure for ensuring the hydrophobic silicone hydrogel lens material to be shielded from any exposure to ocular environments even after at least 30 days of daily uses including daily waring and daily cleaning/disinfecting; and a relatively-durable lubricious hydrogel top coating for ensuring wearing comfort. A method of the invention comprises forming a plasma-reactive hydrophilic polymer hybrid base coating having reactive functional groups on a silicone hydrogel contact lens and heating the silicone hydrogel contact lens with the hybrid base coating in an aqueous solution of a water-soluble and thermally crosslinkable hydrophilic polymeric material to form a stable lubricious hydrogel coating thereon. This method has a minimized adverse impact on the mechanical properties of silicone hydrogel lens body.

5 Claims, No Drawings

(56) References Cited

U.S. PATENT DOCUMENTS

| | | |
|---|---|---|
| 4,833,218 A | 5/1989 | Lee |
| 4,837,289 A | 6/1989 | Mueller et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,079,319 A | 1/1992 | Mueller |
| 5,346,946 A | 9/1994 | Yokoyama et al. |
| 5,358,995 A | 10/1994 | Lai et al. |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,464,667 A | 11/1995 | Kohler et al. |
| 5,486,579 A | 1/1996 | Lai et al. |
| 5,508,317 A | 4/1996 | Mueller |
| 5,583,463 A | 12/1996 | Merritt |
| 5,760,100 A | 6/1998 | Nicolson et al. |
| 5,789,464 A | 8/1998 | Mueller |
| 5,843,346 A | 12/1998 | Morrill |
| 5,849,810 A | 12/1998 | Mueller |
| 5,849,811 A | 12/1998 | Nicolson et al. |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,218,508 B1 | 4/2001 | Kragh et al. |
| 6,451,871 B1 | 9/2002 | Winterton et al. |
| 6,627,124 B1 | 9/2003 | Herbrechtsmeier et al. |
| 6,630,243 B2 | 10/2003 | Valint et al. |
| 6,719,929 B2 | 4/2004 | Winterton et al. |
| 6,762,264 B2 | 7/2004 | Kunzler et al. |
| 6,793,973 B2 | 9/2004 | Winterton et al. |
| 6,800,225 B1 | 10/2004 | Hagmann et al. |
| 6,867,245 B2 | 3/2005 | Iwata et al. |
| 6,881,269 B2 | 4/2005 | Matsuzawa et al. |
| 6,884,457 B2 | 4/2005 | Gilliard et al. |
| 6,896,926 B2 | 5/2005 | Qiu et al. |
| 6,926,965 B2 | 8/2005 | Qiu et al. |
| 6,940,580 B2 | 9/2005 | Winterton et al. |
| 7,078,074 B2 | 7/2006 | Matsuzawa et al. |
| 7,214,809 B2 | 5/2007 | Zanini et al. |
| 7,297,725 B2 | 11/2007 | Winterton et al. |
| 7,384,590 B2 | 6/2008 | Kelly et al. |
| 7,387,759 B2 | 6/2008 | Kelly et al. |
| 7,423,074 B2 | 9/2008 | Lai et al. |
| 7,915,323 B2 | 3/2011 | Awasthi et al. |
| 8,415,405 B2 | 4/2013 | Maggio et al. |
| 8,420,711 B2 | 4/2013 | Awasthi et al. |
| 8,475,529 B2 | 7/2013 | Clarke |
| 8,529,057 B2 | 9/2013 | Qiu et al. |
| 8,614,261 B2 | 12/2013 | Iwata et al. |
| 8,658,748 B2 | 2/2014 | Liu et al. |
| 8,993,651 B2 | 3/2015 | Chang et al. |
| 9,097,840 B2 | 8/2015 | Chang et al. |
| 9,103,965 B2 | 8/2015 | Chang |
| 9,217,813 B2 | 12/2015 | Liu et al. |
| 9,475,827 B2 | 10/2016 | Chang et al. |
| 2002/0025389 A1 | 2/2002 | Matsuzawa et al. |
| 2007/0229758 A1 | 10/2007 | Matsuzawa |
| 2008/0142038 A1 | 6/2008 | Kunzler et al. |
| 2008/0152800 A1 | 6/2008 | Bothe et al. |
| 2008/0174035 A1 | 7/2008 | Winterton |
| 2008/0226922 A1 | 9/2008 | Ferreiro et al. |
| 2009/0186229 A1 | 7/2009 | Muller et al. |
| 2012/0026457 A1* | 2/2012 | Qiu .............................. C08J 5/00 351/159.33 |
| 2012/0026458 A1 | 2/2012 | Qiu et al. |
| 2012/0088843 A1 | 4/2012 | Chang et al. |
| 2012/0088844 A1 | 4/2012 | Kuyu et al. |
| 2012/0244088 A1 | 9/2012 | Saxena et al. |
| 2012/0245249 A1 | 9/2012 | Saxena et al. |
| 2012/0314185 A1 | 12/2012 | Bauman et al. |
| 2013/0118127 A1 | 5/2013 | Kolluru et al. |
| 2013/0337160 A1 | 12/2013 | Holland et al. |
| 2016/0061995 A1 | 3/2016 | Chang et al. |
| 2016/0326046 A1 | 11/2016 | Quinter et al. |
| 2017/0068018 A1 | 3/2017 | Qian et al. |
| 2017/0068019 A1 | 3/2017 | Qian et al. |
| 2017/0165932 A1 | 6/2017 | Qian et al. |
| 2017/0166673 A1 | 6/2017 | Huang et al. |
| 2018/0079157 A1 | 3/2018 | Tucker et al. |
| 2018/0079158 A1 | 3/2018 | Qiu et al. |
| 2018/0079889 A1 | 3/2018 | Chiang et al. |
| 2018/0100038 A1 | 4/2018 | Jing et al. |
| 2018/0100053 A1 | 4/2018 | Jing et al. |
| 2018/0113236 A1 | 4/2018 | Bothe et al. |
| 2018/0120590 A1 | 5/2018 | Bothe et al. |

OTHER PUBLICATIONS

Ho and Yasuda "Ultrathin coating of plasma polymer of methane applied on the surface of silicone contact lenses" Journal of Biomedical Materials Research; vol. 22; pp. 919-937 (1988).

J. Mort and F. Jansen, "Plasma Deposition Processes", in "Plasma Deposited Thin Films", CRC Press Boca Raton (1986), pp. 1-19.

O. Auciello et al. (ed.) "Plasma-Surface Interactions and Processing of Materials"; The Application of Plasmas to Thin Film Deposition Processes; Kluwer Academic Publishers, 1990, pp. 377-399.

N. Dilsiz and G. Akovali "Plasma Polymerization of Selected Organic Compounds", Polymer, vol. 37, No. 2, 1996, pp. 333-342.

* cited by examiner

PROCESS FOR PRODUCING CONTACT LENSES WITH DURABLE LUBRICIOUS COATINGS THEREON

This application claims the benefit under 35 USC § 119 (e) of U.S. provisional application No. 62/396,847 filed 20 Sep. 2016, herein incorporated by reference in its entirety.

The present invention generally relates to a method for producing a soft contact lens having a durable lubricious composite coating thereon with a minimized adverse impact on the mechanical properties of silicone hydrogel contact lens. In addition, the present invention provides soft contact lenses produced according to the method of the invention. A soft contact lens of the invention comprises a silicone hydrogel lens body and a composite coating thereon. The composite coating comprises: a plasma base coating which is chemically-attached directly onto the surface of the silicone hydrogel contact lens and functions as a fail-proof measure for ensuring the hydrophobic silicone hydrogel lens material to be shielded from any exposure to ocular environments even after at least 30 days of daily uses including daily waring and daily cleaning/disinfecting; and a relatively-durable lubricious hydrogel top coating for ensuring wearing comfort.

BACKGROUND

Soft silicone hydrogel contact lenses are increasingly becoming popular because of their high oxygen permeability and comfort. But, a silicone hydrogel material typically has a surface, or at least some areas of its surface, which is hydrophobic (non-wettable) and susceptible to adsorbing lipids or proteins from the ocular environment and may adhere to the eye. Thus, a silicone hydrogel contact lens will generally require a surface modification.

A known approach for modifying the hydrophilicity of a relatively hydrophobic contact lens material is through the use of a plasma treatment, for example, commercial lenses such as Focus NIGHT & DAY™ and O2OPTIX™ (CIBA VISION), and PUREVISION™ (Bausch & Lomb) utilize this approach in their production processes. Advantages of a plasma coating, such as, e.g., those may be found with Focus NIGHT & DAY™, are its durability, relatively high hydrophilicity/wettability), and low susceptibility to lipid and protein deposition and adsorption. But, plasma treatment of silicone hydrogel contact lenses may not be cost effective, because the preformed contact lenses must typically be dried before plasma treatment and because of relative high capital investment associated with plasma treatment equipment. Further, plasma treatment may not provide a silicone hydrogel contact lens with a desirable surface lubricity.

Another approach for modifying the hydrophilicity of a relatively hydrophobic contact lens material is a layer-by-layer (LbL) polyionic material deposition technique (see for example, U.S. Pat. Nos. 6,451,871, 6,719,929, 6,793,973, 6,884,457, 6,896,926, 6,926,965, 6,940,580, and 7,297,725, and U.S. Patent Application Publication Nos. US 2007/0229758A1, US 2008/0174035A1, and US 2008/0152800A1). Although the LbL deposition technique can provide a cost effective process for rendering a silicone hydrogel material wettable, LbL coatings may not be thick enough and durable (i.e., forming holes or patches which expose the silicone hydrogel materials to ocular environment and become susceptible to the depositions of lipids and proteins), because the low pH of an LbL coating solution would require a short coating time in order to reduce the acid-induced degradation of the silicone hydrogel material of a contact lens. Further, LbL coatings can have relatively high densities of surface charges, in particular, negative surface charges; which can interfere with contact lens cleaning and disinfecting solutions due to their high susceptibility to deposition and accumulation of positively charged antimicrobials (e.g., polyhexamethylene biguanide, Polyquaternium-1®, or the like) commonly found in most multipurpose lens care solutions. Those positively charged antimicrobials adsorbed by the silicone hydrogel lenses may be released into the eye and may cause undesirable clinical symptoms in some persons, such as diffuse corneal staining and product intolerance, when the lenses are worn by patients.

To improve the durability, crosslinking of LbL coatings on contact lenses has been proposed in commonly-owned copending US patent application publication Nos. 2008/0226922 A1 and 2009/0186229 A1 (incorporated by reference in their entireties). However, crosslinked LbL coatings may have a hydrophilicity and/or wettability inferior than original LbL coatings (prior to crosslinking); it still have relative high densities of negative surface charges and not adequate lubricity; and it may still be susceptible to delamination because the LbL may not be stably adhered onto the lens surface.

US Patent Application Publication No. 2008/0142038A1 describes another approach for modifying the hydrophilicity of a relatively hydrophobic contact lens material. According to this approach, a preformed silicone hydrogel contact lens in unhydrated state is subjected to a oxidation plasma treatment in an atmosphere composed of a suitable media, such as, ammonia, an alkylamine, air, water, peroxide, oxygen gas, methanol, acetone, etc., in order to improve or promote adhesion for bonding of the subsequent carboxylic acid-containing polymeric or copolymeric layer; then the plasma-treated lens is extracted in an organic solvent (e.g., isopropanol), rehydrated in water, and packaged in a polypropylene blister pack containing a coating solution of a polyanionic polymer (e.g., polyacrylic acid); and finally the packaged lens is sterilized in steam in an autoclave at a temperature up to and including 100° C. This approach would still have the above-described shortcomings for the LbL-approach, such as, high susceptibility to deposition and accumulation of positively charged antimicrobials in a lens care solution and insufficient durability.

U.S. Pat. No. 6,630,243 disclose another approach for modifying the hydrophilicity of a relatively hydrophobic contact lens material. According to this approach, a preformed silicone hydrogel contact lens in unhydrated state is subjected to plasma polymerization in a hydrocarbon-containing atmosphere to form a polymeric carbonaceous layer on the lens surface; reactive functionalities are then generated on the surface of the carbonaceous layer; and finally a hydrophilic reactive polymer is covalently attached to the surface of the carbonaceous layer through the surface reactive functionalities of the carbonaceous layer. This approach may not provide a silicone hydrogel contact lens with a desirable surface lubricity.

Recently, a new cost-effective approach has been described in U.S. Pat. No. 8,529,057 (herein incorporated by reference in its entirety) for applying a hydrogel coating onto a silicone hydrogel contact lens, in which an organic solvent-based coating solution of a polyanionic polymer is involved in forming an interpenetrating base coating (i.e., an anchoring layer) on a silicone hydrogel contact lens and then a partially-crosslinked hydrophilic polymeric material are covalently attached onto the anchoring layer directly in a lens package during autoclave. However, this approach may not be suitable for a silicone hydrogel contact lens having a base plasma coating thereon, because the swelling of the silicone hydrogel lens by the organic solvent may damage the plasma base coating. Furthermore, use of organic solvents can be costly, not environmentally friendly and time-consuming to implement in manufacturing setting.

Therefore, there is still a need for an improved method for producing silicone hydrogel contact lenses with a composite coating, which comprises a plasma base coating and a durable, lubricious hydrogel top coating and which has a minimized susceptibility to high deposition and accumulation of positively charged antimicrobials, in a manner to have a minimized adverse impact on the mechanical properties of silicone hydrogel lens body.

SUMMARY OF THE INVENTION

The invention, in one aspect, provides a method for producing soft contact lenses having a composite coating thereon, the method of invention comprising the steps of: (1) obtaining a plasma-treated silicone hydrogel contact lens having a plasma base coating thereon, wherein the plasma base coating has a thickness of from about 0.5 nm to about 40 nm; (2) contacting the plasma-treated silicone hydrogel contact lens with a first aqueous coating solution including a poly(alkylacrylic acid) polymer at a coating temperature of at least 35° C. or higher for a contacting time of at least 60 minutes or longer to form a soft contact lens precursor which is the plasma-treated silicone hydrogel contact lens additionally having a layer of poly(alkylacrylic acid) on top of the plasma base coating, wherein the first aqueous coating solution has a pH from 2.3 to 5.0 at the coating temperature and the poly(alkylacrylic acid)polymer is a homopolymer or copolymer of methacrylic acid, ethyl acrylic acid or 2-(meth)acrylamidoglycolic acid, provided that the first aqueous coating solution includes one or more non-polymeric acid in a total amount for having an acid-induced change in elastic modulus, ΔE, of not greater than 15%, wherein $$\Delta E = \left| \frac{E_i - E_0}{E_0} \right| \times 100\%$$

in which $E_i$ is the elastic modulus of the plasma-treated silicone hydrogel contact lens after being in contact with the first aqueous coating solution at the coating temperature for the contacting time and $E_o$ is the elastic modulus of the plasma-treated silicone hydrogel contact lens prior to contacting with the first aqueous coating solution; and (3) heating the soft contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the poly(alkylacrylic acid) polymer so as to form the soft contact lens with the composite coating thereon, wherein the composite coating comprise the plasma base coating and a hydrogel coating on top of the plasma base coating, wherein the soft contact lens in fully hydrated state has a friction rating of about 2 or lower after 7 cycles of manual rubbing test.

In another aspect, the invention provides a silicone hydrogel contact lens obtained according to a method of the invention. A soft contact lens of the invention comprises: a silicone hydrogel lens body which is essentially made of a silicone hydrogel material; and a composite coating thereon, wherein the composite coating comprises a plasma base coating substantially free of (preferably free of) cracks, an anchor layer of poly(alkylacrylic acid) on top of the plasma base coating, and a hydrogel layer which is covalently attached onto the anchor layer, wherein the plasma base coating has a thickness of from about 0.5 nm to about 40 nm, wherein the poly(alkylacrylic acid)polymer is a homopolymer or copolymer of methacrylic acid, ethyl acrylic acid or 2-(meth)acrylamidoglycolic acid, wherein the soft contact lens in a fully-hydrated state has a friction rating of about 2 or lower after 7 cycles of manual rubbing test and an oxygen permeability of at least about 40 barrers.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel bulk (core) material.

A "soft contact lens" refers to a contact lens which has an elastic modulus (i.e., Young's modulus) of less than 2.0 MPa.

A "hydrogel" or "hydrogel material" refers to a cross-linked polymeric material which has three-dimensional polymer networks (i.e., polymer matrix), is insoluble in water, but can hold at least 10 percent by weight of water in its polymer matrix when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "substantially free of silicone" in reference to a hydrogel coating means that a surface silicon atomic percentage measured by XPS on a contact lens in dried state is less than about 200%, preferably less than about 175%, more preferably less than about 150%, even more preferably less than about 125% of the silicon atomic percentage of a control sample known to be inherently (theoretically) free of silicon (e.g., a polyethylene sheet, a DAILIES® AquaComfortPlus™ contact lens in dried state from Alcon or an ACUVUE® Moist lens in dried state from Johnson & Johnson). It is understood that a small percentage of silicone may be optionally (but preferably not) incorporated into the polymer network of the hydrogel coating so long as it would not significantly deteriorate the surface properties (hydrophilicity, wettability, and/or lubricity) of a contact lens.

"Hydrophilic," as used herein, describes a material or portion thereof that will more readily associate with water than with lipids.

"Surface hydrophilicity", as used herein, describes a surface property that represents the extent to which a surface interacts with water, as measured by water-break-up-time (WBUT). The higher the value of WBUT is, the higher the surface hydrophilicity is.

In accordance with the invention, the "surface lubricity" of a contact lens (or a medical device) is measured by a friction rating which is a number from 0 to 4. The higher the value of friction rating is, the lower the surface lubricity is.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.1% by weight at room temperature (i.e., a temperature of about 22° C. to about 28° C.).

The term "insoluble", in reference to a compound or material in a solvent, means that the compound or material can be dissolved in the solvent to give a solution with a concentration of less than 0.005% by weight at room temperature (as defined above).

As used in this application, the term "ethylenically unsaturated group" is employed herein in a broad sense and is intended to encompass any groups containing at least one >C=C< group. Exemplary ethylenically unsaturated groups include without limitation (meth)acryloyl

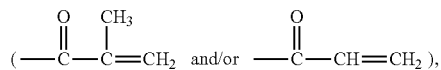

allyl, vinyl, styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

An "acrylic monomer" refers to a vinylic monomer having one sole (meth)acryloyl group.

An "N-vinyl amide monomer" refers to an amide compound having a vinyl group (—CH=CH$_2$) that is directly attached to the nitrogen atom of the amide group.

A "macromer" or "prepolymer" refers to a compound or polymer that contains ethylenically unsaturated groups and has an average molecular weight of greater than 700 Daltons.

As used in this application, the term "vinylic crosslinker" refers to a compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the weight-average molecular weight unless otherwise specifically noted or unless testing conditions indicate otherwise.

A "polysiloxane segment" refers to a polymer chain consisting of at least three consecutively- and directly-linked siloxane units (divalent radical) each independent of one another having a formula of

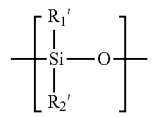

in which $R_1'$ and $R_2'$ are two substituents independently selected from the group consisting of $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-(OC$_2$H$_4$)$_{\gamma 1}$—OR$^\circ$ (in which alk is $C_1$-$C_6$ alkyl diradical, R$^\circ$ is H or $C_1$-$C_4$ alkyl and $\gamma 1$ is an integer from 1 to 10), a $C_2$-$C_{40}$ organic radical having at least one functional group selected from the group consisting of hydroxyl group (—OH), carboxyl group (—COOH), —NR$_3$'R$_4$', amino linkages of —NR$_3$'—, amide linkages of —CONR$_3$'—, amide of —CONR$_3$'R$_4$', urethane linkages of —OCONH—, and $C_1$-$C_4$ alkoxy group, or a linear hydrophilic polymer chain, in which R$_3$' and R$_4$' independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polysiloxane vinylic crosslinker" refers to a compound comprising at least one polysiloxane segment and at least two ethylenically-unsaturated groups.

A "chain-extended polysiloxane vinylic crosslinker" refers to a compound comprising at least two ethylenically-unsaturated groups and at least two polysiloxane segments each pair of which is linked by one divalent radical.

A "polycarbosiloxane" refers to a compound containing at least one polycarbosiloxane segment which is a polymer chain consisting of at least three consecutively- and directly-linked siloxane units (divalent radical) each independent of one another having a formula of

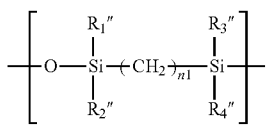

in which n1 is an integer of 2 or 3, $R_1''$, $R_2''$, $R_3''$, and $R_4''$ independent of one another are a $C_1$-$C_6$ alkyl radical (preferably methyl).

A "polycarbosiloxane vinylic monomer" refers to a compound comprising at least one polycarbosiloxane segment and one sole ethylenically-unsaturated group.

A "polycarbosiloxane vinylic crosslinker" refers to a compound comprising at least one polycarbosiloxane segment and at least two ethylenically-unsaturated groups.

The term "fluid" as used herein indicates that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "oxazoline" refers to a compound of

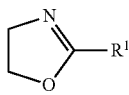

in which: $R^1$ is hydrogen, methyl, ethyl, N-pyrrolidonylmethyl, N-pyrrolidonylethyl, N-pyrrolidonylpropyl, or a monovalent radical of -alk-(OC$_2$H$_4$)$_{m3}$—OR" in which alk is $C_1$-$C_4$ alkyl diradical; R" is $C_1$-$C_4$ alkyl (preferably methyl); and m3 is an integer from 1 to 10 (preferably 1 to 5).

In this application, the term "polyoxazoline" refers to a linear polymer having a formula of

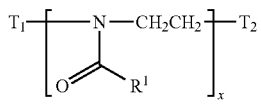

in which: $T_1$ and $T_2$ are two terminal groups; $R^1$ is hydrogen, methyl, ethyl, N-pyrrolidonylmethyl, N-pyrrolidonylethyl, N-pyrrolidonylpropyl, or a monovalent radical of -alk-(OC$_2$H$_4$)$_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500. A polyoxazoline segment has a divalent polymer chain of a formula of

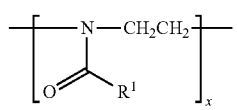

in which $R^1$ and x are as defined above.

In this application, the term "poly(2-oxazoline-co-ethyleneimine)" refers to a statistical copolymer having a formula of

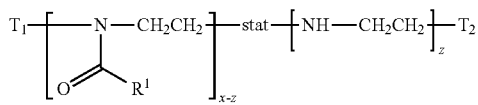

in which: $T_1$ and $T_2$ are terminal groups; $R^1$ is hydrogen, methyl, ethyl, N-pyrrolidonylmethyl, N-pyrrolidonylethyl, N-pyrrolidonylpropyl, or a monovalent radical of -alk-(OC$_2$H$_4$)$_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly(2-oxazoline-co-ethyleneimine)-epichlorohydrin are disclosed in U.S. pat. Appl. pub. No. 2016/0061995 A1 (herein incorporated by reference in its entirety).

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged, divalent radical (or group or moiety) of

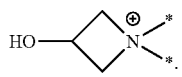

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

The term "azlactone" refers to a mono-valent radical of formula

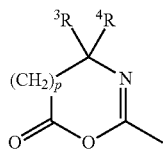

in which p is 0 or 1; $^3R$ and $^4R$ independently of each other is $C_1$-$C_8$ alkyl (preferably methyl).

As used in this application, the term "phosphorylcholine" refers to a monovalent zwitterionic group of

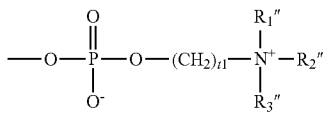

in which t1 is an integer of 1 to 5 and $R_1''$, $R_2''$ and $R_3''$ independently of one another are $C_1$-$C_8$ alkyl or $C_1$-$C_8$ hydroxyalkyl.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

A "water contact angle" refers to an average water contact angle (i.e., contact angles measured by Sessile Drop method) at the room temperature, which is obtained by averaging measurements of contact angles with at least 3 individual contact lenses.

The term "intactness" in reference to a coating on a silicone hydrogel contact lens is intended to describe the extent to which the contact lens can be stained by Sudan Black in a Sudan Black staining test described in Example 1. Good intactness of the coating on a silicone hydrogel contact lens means that there is practically no Sudan Black staining of the contact lens.

The term "durability" in reference to a coating on a silicone hydrogel contact lens is intended to describe that the coating on the silicone hydrogel contact lens can survive a desired number of cycles of manual rubbing tests.

As used herein, "surviving a number ("j") of cycles of manual rubbing tests" in reference to a coating on a contact lens means that after j cycles of digitally rubbing tests according to the procedure described in Example 1, the contact lens has a digital-rubbing-induced increase in friction rating after j cycles of manual rubbing tests, $\Delta FR_{DR}(j)$, of about 60% or less (preferably about 50% or less, more preferably about 40% or less, even more preferably about 30% or less), wherein $$\Delta FR_{DR}(j) = \frac{FR_{jDR} - FR_{0DR}}{4} \times 100\%$$

in which $FR_{0DR}$ is the friction rating of the contact lens which is in fully-hydrated state and is subjected to zero manual rubbing test, and $FR_{jDR}$ is the friction rating of the contact lens which is in fully hydrated state and has been subjected to j cycles of manual rubbing tests, wherein j is an integer of 2 (preferably 7, more preferably 14, even more preferably 30).

The term "one cycle of manual rubbing test" means that contact lenses (or medical devices) with a coating thereon are digitally rubbed (wearing disposable powder-free latex gloves) with RENU® multi-purpose lens care solution (or another multi-purpose lens care solution) for 20 seconds and then rinsed with saline. The above procedure can be repeated for a given times, e.g., from 2 to 30 times and number of repetitions of manual rubbing tests is the number of cycles of manual rubbing tests.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures described in Example 1 of 2012/0026457 A1 (herein incorporated by reference in its entirety). Oxygen permeability is conventionally expressed in units of barrers, where "barrer" is defined as [(cm$^3$ oxygen)(mm)/(cm$^2$)(sec)(mm Hg)]×10$^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [(cm$^3$ oxygen)/(cm$^2$)(sec)(mm Hg)]×10$^{-9}$.

The "ion permeability" through a lens correlates with the Ionoflux Diffusion Coefficient. The Ionoflux Diffusion Coefficient, D (in units of [mm$^2$/min]), is determined by applying Fick's law as follows:

$$D = -n'/(A \times dc/dx)$$

where n'=rate of ion transport [mol/min]; A=area of lens exposed [mm$^2$]; dc=concentration difference [mol/L]; dx=thickness of lens [mm].

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

An "aqueous solution" or a "water-based solution" interchangeably refers to a solution which is a homogeneous mixture consisting of a water-based solvent and one or more solutes dissolved in the water-based solvent. A "water-based solvent" is intended to describe a solvent system which consists of at least 70%, preferably at least 80%, more preferably at least 90%, even more preferably at least 95%) by weight of water and at most 30% (preferably about 20% or less, more preferably about 10% or less, even more preferably about 5% or less, in particular about 2% or less) by weight of one or more organic solvents relative to the weight of the solvent system. An aqueous coating solution refers to an aqueous solution containing at least one polymeric coating material as a solute in the solution.

An "organic-based solution" refers to a solution which is a homogeneous mixture consisting of an organic-based solvent and one or more solutes dissolved in the organic based solvent. An "organic-based solvent" is intended to describe a solvent system which consists of one or more organic solvents and less than 40%, preferably about 30% or less, more preferably about 20% or less, even more preferably about 10% or less, in particular about 5% or less by weight of water relative to the weight of the solvent system. An organic-based coating solution refers to an organic-based solution containing at least one polymeric coating material as a solute in the solution.

The invention is generally related to a method for producing soft contact lenses each of which comprises a silicone hydrogel lens body (i.e., a silicone hydrogel substrate having a 3-dimensional shape of a contact lens) and a composite coating thereon and also to soft contact lenses produced according to a method of the invention. The composite coating on a soft contact lens of the invention comprises: (1) a plasma base coating which is chemically-attached directly onto the surface of the silicone hydrogel lens body and functions as a fail-proof measure for ensuring the hydrophobic silicone material to be shielded completely from any exposure to ocular environments even after at least 30 days of daily uses including daily waring and daily cleaning/disinfecting; and (2) a hydrogel top coating which has a minimized susceptibility to deposition and accumulation of positively charged antimicrobials and is relatively-durable and lubricious, so as to ensure wearing comfort even for weekly/monthly lens use regime. It is discovered that an organic-based coating solution of a poly(alkylacrylic acid) may cause damages to the plasma base coating of a plasma-treated silicone hydrogel contact lens and may form a layer of poly(alkylacrylic acid) which can uptake a relatively-high amount of positively-charged antimicrobials. To eliminate the risk of damaging the plasma base coating and to minimize the uptakes of positively-charged antimicrobials, the contacting time of a plasma-treated silicone hydrogel contact lens with the organic based solution of poly(alkylacrylic acid) must be shortened to an extent that the coating process may not be implemented in a production environment, because there may be a too big variation in contacting time and subsequently variation in the quality of products. The present invention is also partly based on the discovery that by selecting and combining the coating conditions including the pH of an aqueous coating solution, the concentration of one or more non-polymer acid, the coating temperature (i.e., the temperature of the aqueous coating solution), and the coating time (i.e., the contacting time of a silicone hydrogel contact lens with the aqueous coating solution), one can obtain soft contact lenses with a composite coating of the invention without causing damages to plasma base coatings and degradations of silicone hydrogel lens materials.

It is believed that in order to effectively form an LbL layer of a poly(alkylacrylic acid) on a silicone hydrogel contact lens, all or the most of the carboxylic acid groups of the poly(alkylacrylic acid) should be deprotonated, and as such, the pH of an aqueous coating solution of the poly(alkylacrylic acid) would be low. In general, a low pH is achieved by adding one or more non-polymeric acids into the aqueous coating solution. However, due to their small molecular sizes, non-polymer acids can penetrate into a silicone hydrogel contact lens and may cause degradation of the silicone hydrogel material as evidenced by changes in elastic modulus, when the silicone hydrogel contact lens is in contact with an aqueous coating solution containing the non-polymeric acids for a relatively-long time. If the contacting time is shortened in order to minimize the acid-induced degradation, a layer of a coating material may not be properly formed on the silicone hydrogel contact lens or a formed layer is too thin as an anchor layer for forming a hydrogel top coating which could have neither a desired lubricity nor a desired durability for weekly/monthly use regime. It is discovered here that by slightly increasing the temperature of the aqueous coating solution, e.g., to a temperature in the range between about 40° C. to about 50° C., a relatively-thick layer of poly(alkylacrylic acid) can be formed on the plasma-treated silicone hydrogel contact lens with minimal or no damages to the plasma coating and with minimal or no degradation of the silicone hydrogel material (i.e., minimal or no change in elastic modulus) at a relatively-higher pH.

The invention, in one aspect, provides a method for producing soft contact lenses, the method of invention comprising the steps of:

(1) obtaining a plasma-treated silicone hydrogel contact lens having a plasma base coating thereon, wherein the plasma base coating has a thickness of from about 0.5 nm to about 40 nm (preferably from about 1 nm to about 35 nm, more preferably from about 2 nm to about 30 nm, even more preferably from about 3 nm to about 25 nm);

(2) contacting the plasma-treated silicone hydrogel contact lens with a first aqueous coating solution including a poly(alkylacrylic acid) polymer at a coating temperature of at least 40° C. or higher (preferably from about 40° C. to about 50° C.) for a contacting time of from about 60 minutes to about 300 minutes (preferably from about 70 minutes to about 240 minutes, more preferably from about 80 minutes to about 210 minutes, even more preferably from about 90 minutes to about 180 minutes) to form a soft contact lens precursor which is the plasma-treated silicone hydrogel contact lens additionally having a layer of poly(alkylacrylic acid) on top of the plasma base coating, wherein the first aqueous coating solution has a pH from 2.3 to 5.0 (preferably from 2.5 to 4.8, more preferably from 2.5 to about 4.5) at the coating temperature and the poly(alkylacrylic acid)polymer is a homopolymer or copolymer of methacrylic acid, ethyl acrylic acid or 2-(meth)acrylamidoglycolic acid, provided that the first aqueous coating solution includes one or more non-polymeric acids in a total amount (preferably in a total amount of about 1% by weight or less, more preferably in a total amount of about 0.75% by weight or less, even more preferably in a total amount of about 0.5% by weight or less, most preferably in a total amount of about 0.4% by weight) for having an acid-induced change in elastic modulus, $\Delta E$, of not greater than 15% (preferably not greater than 10%, even more preferably not greater than 7.5%, most preferably not greater than 5%), wherein $$\Delta E = \left|\frac{E_i - E_0}{E_0}\right| \times 100\%$$

in which $E_i$ is the elastic modulus of the plasma-treated silicone hydrogel contact lens after being in contact with the first aqueous coating solution at the coating temperature for the contacting time and $E_o$ is the elastic modulus of the plasma-treated silicone hydrogel contact lens prior to contacting with the first aqueous coating solution; and (3) heating the soft contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the poly(alkylacrylic acid) polymer so as to form the soft contact lens with the composite coating thereon, wherein the composite coating comprise the plasma base coating and a hydrogel coating on top of the plasma base coating, wherein the soft contact lens in fully hydrated state has a friction rating of about 2 or lower (preferably about 1.5 or lower, more preferably about 1.0 or lower, even more preferably about 0.5 or lower) after 7 cycles of manual rubbing test.

In accordance with the invention, a silicone hydrogel contact lens is any silicone hydrogel contact lens produced according to any lens manufacturing processes (or so-called "preformed silicone hydrogel contact lens"). A person skilled in the art knows very well how to make silicone hydrogel (SiHy) contact lenses. For example, SiHy contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of silicone hydrogel buttons as used in making customized contact lenses. In cast-molding, a lens formulation typically is dispensed into molds and cured (i.e., polymerized and/or crosslinked) in molds for making contact lenses. For production of silicone hydrogel (SiHy) contact lenses, a SiHy lens-forming composition (or SiHy lens formulation) for cast-molding or spin-cast molding or for making SiHy rods used in lathe-cutting of contact lenses generally comprises at least one components selected from the group consisting of a silicone-containing vinylic monomer, a silicone-containing vinylic crosslinker, a silicone-containing prepolymer, a hydrophilic vinylic monomer, a hydrophobic vinylic monomer, a non-silicone vinylic crosslinking crosslinker, a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent (i.e., UV-absorbing vinylic monomers), a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy) silyl group, polysiloxane vinylic monomers, polycarbosiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Examples of preferred vinylic monomers each having a bis(trialkylsilyloxy)alkylsilyl group or a tris(trialkylsilyloxy)silyl group include without limitation tris(trimethylsilyloxy)silylpropyl (meth)acrylate, [3-(meth)acryloxy-2-hydroxypropyloxy]propylbis(trimethylsiloxy)methylsilane,

[3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsilicoxy) methylsilane, 3-(meth)acryloxy-2-hydroxypropyloxy) propyltris(trimethylsiloxy)silane, N-[tris(trimethylsiloxy)silylpropyl]-(meth) acrylamide, N-(2-hydroxy-3-(3-(bis(trimethylsilyloxy) methylsilyl)propyloxy)propyl)-2-methyl (meth)acrylamide, N-(2-hydroxy-3-(3-(bis(trimethylsilyloxy)methylsilyl)propyloxy)propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl) propyloxy)propyl) (meth)acrylamide, N-[tris(dimethylpropylsiloxy)silylpropyl]-(meth)acrylamide, N-[tris(dimethylphenylsiloxy)silylpropyl] (meth)acrylamide, N-[tris(dimethylethylsiloxy)silylpropyl](meth)acrylamide, N,N-bis[2-hydroxy-3-(3-(bis(trimethylsilyloxy) methylsilyl)propyloxy)propyl]-2-methyl (meth)acrylamide, N,N-bis[2-hydroxy-3-(3-(bis(trimethylsilyloxy)methylsilyl) propyloxy)propyl] (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, N-[2-hydroxy-3-(3-(t-butyldimethylsilyl)propyloxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio) propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, those disclosed in U.S. Pat. Nos. 9,097,840, 9,103,965 and 9,475,827 (herein incorporated by references in their entireties), and mixtures thereof. The above preferred silicone-containing vinylic monomers can be obtained from commercial suppliers or can be prepared according to procedures described in U.S. Pat. Nos. 7,214,809, 8,475,529, 8,658,748, 9,097,840, 9,103,965, and 9,475,827 (herein incorporated in reference in their entireties).

Examples of preferred polysiloxane vinylic monomers include without limitation mono-(meth)acryloyl-terminated, monoalkyl-terminated polysiloxanes of formula (I) include without limitation α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth)acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxyethylamino-2-hydroxypropyloxypropyl]-terminated ω-butyl (or ω-methyl) terminated polydimethylsiloxane, α-[3-(meth)acryloxypropylamino-2-hydroxypropyloxypropyl]-terminated ω-butyl (or ω-methyl) terminated polydimethylsiloxane, α-[3-(meth)acryloxybutylamino-2-hydroxypropyloxypropyl]-terminated ω-butyl (or ω-methyl) terminated polydimethylsiloxane, α-(meth)acryloxy(polyethylenoxy)-2-hydroxypropyloxypropyl]-terminated w-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylaminopropyl]-terminated ω-butyl (or ω-methyl) terminated polydimethylsiloxane, α-[(meth)acryloxy-2-hydroxypropyl-aminopropyl]-terminated w-butyl (or ω-methyl) terminated polydimethylsiloxane, α-[(meth)acryloxy-2-hydroxypropyloxy-(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated w-butyl (or ω-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamidopropyloxy-2-hydroxypropyloxypropyl]-terminated ω-butyl (or ω-methyl) terminated polydimethylsiloxane, α-[3-(meth)acrylamido-isopropyloxy-2-hydroxypropyloxypropyl]-terminated ω-butyl (or ω-methyl) terminated polydimethylsiloxane, α-[3-(meth)acrylamidobutyloxy-2-hydroxypropyloxypropyl]-terminated ω-butyl (or ω-methyl) terminated polydimethylsiloxane, α-[3-(meth)acryloylamido-2-hydroxypropyloxypropyl]terminated ω-butyl (or ω-methyl) polydimethylsiloxane, α-[3-[N-methyl-(meth)acryloylamido]-2-hydroxypropyloxypropyl] terminated ω-butyl (or ω-methyl) terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, mono-vinyl carbonate-terminated mono-alkyl-terminated polydimethylsiloxanes, mono-vinyl carbamate-terminated mono-alkyl-terminated polydimethylsiloxane, those disclosed in U.S. Pat. Nos. 9,097,840 and 9,103,965 (herein incorporated by references in their entireties), and mixtures thereof. The above preferred polysiloxanes vinylic monomers can be obtained from commercial suppliers (e.g., Shin-Etsu, Gelest, etc.) or prepared according to procedures described in patents, e.g., U.S. Pat. Appl. Pub. Nos. 6867245, 8415405, 8475529, 8614261, and 9217813 (herein incorporated in references in their entireties), or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Any polycarbosiloxane vinylic monomers can be used in the invention. Examples of preferred polycarbosiloxane vinylic monomers include without limitation those disclosed in U.S. Pat. Nos. 7,915,323 and 8,420,711 and in U.S. Pat. Appl. Pub. Nos. 2012/244088A1 and 2012/245249A1 (herein incorporated by references in their entireties).

Any suitable silicone-containing vinylic crosslinkers can be used in the invention. Examples of preferred silicone-containing vinylic crosslinkers include without limitation polysiloxane vinylic crosslinkers, polycarbosiloxane vinylic crosslinkers, and combinations thereof.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100 (herein incorporated by reference in its entirety); polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties).

Examples of preferred di-(meth)acryloyloxy-terminated polysiloxane vinylic crosslinkers includes without limitation the reaction products of glycidyl methacrylate with di-amino-terminated polydimethylsiloxanes; the reaction products of glycidyl methacrylate with di-hydroxyl-terminated polydimethylsiloxanes; the reaction products of isocyantoethyl (meth)acrylate with di-hydroxyl-terminated polydimethylsiloxanes; di-(meth)acryloyloxy-terminated polysiloxane vinylic crosslinkers each having hydrophilized siloxane units each having one methyl substituent and one monovalent $C_4$-$C_{40}$ organic radical substituent having 2 to 6 hydroxyl groups as disclosed in U.S. patent application Ser. No. 15/376,700 (herein incorporated by reference in its entirety); chain-extended polysiloxabe vinylic crosslinkers disclosed in US201008843A1 and US20120088844A1 (herein incorporated by references in their entireties); chain-extended polysiloxane vinylic crosslinkers described in U.S. Pat. Nos. 5,034,461, 5,416,132, 5,449,729, 5,760,100, 7,423,074, and 8,529,057 (herein incorporated by reference in their entireties); chain-extended polysiloxane vinylic crosslinkers described in U.S. Pat. App. Ser. No. 62/406,465 (herein incorporated by reference in its entirety); chain-extended polysiloxane vinylic crosslinkers described in U.S. Pat. App. Ser. No. 62/406,467 (herein incorporated by reference in its entirety); chain-extended polysiloxane vinylic crosslinkers described in U.S. Pat. No. 8,993,651 (herein incorporated by reference in its entirety); α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxy-propyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxyisopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane.

Any polycarbosiloxane vinylic crosslinkers can be used in the invention. Examples of preferred polycarbosiloxane vinylic crosslinkers include without limitation those disclosed in U.S. Pat. Nos. 7,915,323 and 8,420,711 and in U.S. Pat. Appl. Pub. Nos. 2012/0244088 and 2012/0245249 (herein incorporated by references in their entireties).

Any hydrophilic vinylic monomers can be used in the invention. Examples of preferred hydrophilic vinylic monomers are alkyl (meth)acrylamides (as described below), hydroxyl-containing acrylic monomers (as described below), amino-containing acrylic monomers (as described below), carboxyl-containing acrylic monomers (as described below), N-vinyl amide monomers (as described below), methylene-containing pyrrolidone monomers (i.e., pyrrolidone derivatives each having a methylene group connected to the pyrrolidone ring at 3- or 5-position) (as described below), acrylic monomers having a $C_1$-$C_4$ alkoxyethoxy group (as described below), vinyl ether monomers (as described below), allyl ether monomers (as described below), phosphorylcholine-containing vinylic monomers (as described below), N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, and combinations thereof.

Examples of preferred N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing ($=CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly (ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy) propyl-2'-(trimethylammonio)ethylphosphate), 4-((meth)acryloyloxy)butyl-2'-(trimethylammonio) ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth) acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy) pentyl-2'-(trimethylammonio)ethylphosphate, 2-((meth) acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

In accordance with the invention, any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethylthio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth) acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth) acryloxyethyl] phosphate, trimethylolpropane di-(meth) acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'- methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

All the components discussed above in a SiHy lens formulation are well known to a person skilled in the art as evidenced by the fact that numerous SiHy lens formulations have been described in numerous patents and patent applications published by the filing date of this application. All of them can be used in obtaining a preformed SiHy lens in the invention. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, somofilcon A, stenfilcon A, smafilcon A, enfilcon A, and efrofilcon A can also be used in making preformed SiHy contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a SiHy contact lens. Examples of preferred reusable molds are those disclosed in U.S. Pat. Nos. 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J. Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, the SiHy lens formulation can be introduced (dispensed) into a cavity formed by a mold according to any known methods.

After the SiHy lens formulation is dispensed into the mold, it is polymerized to produce a preformed contact lens. Crosslinking may be initiated thermally or actinically, preferably by exposing the lens-forming composition in the mold to a spatial limitation of actinic radiation to crosslink the polymerizable components in the SiHy lens formulation.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above.

A silicone hydrogel contact lens can be dried according to any method known to a person skilled in the art and then be subjected to plasma-treatment by exposing it to a plasma (also referred to as "electrical glow discharge plasma") (i.e., forming a "plasma-treated silicone hydrogel contact lens"). Examples of plasma treatment are those disclosed in U.S. Pat. Nos. 4,143,949; 4,312,575; 5,464,667, 6,881,269; and 7,078,074 (herein incorporated by references in their entireties).

A person skilled in the art understand well that a plasma (i.e., electrical glow discharge plasma) is a partially ionized gas which consists of large concentrations of excited atomic, molecular, ionic, and free-radical species and which is generated subjecting a gas in a vacuum chamber to an electric field, typically at radio frequency (rf) (or at a microwave or other frequency). The excited species interact with solid surfaces of an article placed in the plasma, resulting in the chemical and physical modification of the material surface, i.e., a plasma coating.

For a review of plasma treatment and its uses reference is made to R. Hartmann "Plasma polymerisation: Grundlagen, Technik und Anwendung, Jahrb. Oberflächentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341.

As an illustrated example of plasma treatment of silicone hydrogel contact lenses, one or more preformed silicone hydrogel contact lenses are placed in a reactor chamber between opposing electrodes. The chamber is then sealed and depressurized by a vacuum system. Significant time is required to pump the system to the operative pressure. When a suitable pressure is achieved in the chamber, a process gas (i.e., a plasma gas) is introduced into the chamber interior, and the electrodes are energized. The resulting plasma cloud may apply a thin layer of polymer (or a polymer coating) to the lens and/or change the chemical composition of a top layer of the lens surface depending upon the process gas used. After an appropriate time, the electrodes are de-energized, and the reactor chamber is brought back to atmospheric pressure so that the lenses may be removed.

Plasma treatment systems are known to a person skilled in the art and have been disclosed in patents and articles. For example, Peng Ho and Yasuda describe, in their paper ("Ultrathin Coating Of Plasma Polymer Of Methane Applied On The Surface Of Silicone Contact Lenses," Journal of Biomedical Materials Research, Vol. 22, 919-937 (1988), herein incorporated by reference in its entirety), a batch system (or a rotary plasma system) including a bell-shaped vacuum chamber in which opposing aluminum electrodes are disposed and a rotatable aluminum plate sits between the electrodes and is driven by an induction motor within the system. Matsuzawa and Winterton disclose in U.S. Pat. No. 6,881,269 (herein incorporated by reference in its entirety) a linear plasma system.

In accordance with the invention, the preformed silicone hydrogel contact lens in a dried state is treated with a plasma generated in a plasma gas (i.e., an atmosphere) compose of a mixture of a $C_1$-$C_6$ hydrocarbon and a secondary gas selected from the group consisting of air, $N_2$, $O_2$, $CO_2$, and combinations thereof (preferably a mixture of a $C_1$-$C_4$ hydrocarbon and a secondary gas selected from the group consisting of air, $N_2$, $O_2$, $CO_2$, and combinations thereof, more preferably a mixture of methane and a secondary gas selected from the group consisting of air, $N_2$, $O_2$, $CO_2$, and combinations thereof).

In accordance with the invention, the thickness of the plasma base coating is from about 0.5 nm to about 40 nm, preferably from about 1 nm to about 35 nm, more preferably from about 2 nm to about 30 nm, even more preferably from about 3 nm to about 25 nm. A plasma coating with a thickness recited above can have minimally adverse impacts upon the oxygen permeability and ion permeability of a silicone hydrogel contact lens. The thickness of a plasma coating (layer) can be determined according to any known method. For example, it can be measured by ellipsometery on silicon wafers which are plasma-treated together with preformed silicone hydrogel contact lenses. A person knows how to control the plasma conditions (especially plasma treatment time) for obtaining a desired thickness of a particular prime plasma layer on a silicone hydrogel contact lens.

Where a plasma used in plasma treatment is generated in an atmosphere (i.e., plasma gas) composed of a mixture of a $C_1$-$C_6$ hydrocarbon and a secondary gas selected from the group consisting of air, $O_2$, $CO_2$, $N_2$, and combinations thereof, the composition of a plasma gas can be controlled by the flow rates (sccm) of each individual gases in the mixture. Preferably, the flow rate ratio of a $C_1$-$C_6$ hydrocarbon over the secondary gas (air, $O_2$, $CO_2$, $N_2$, or combinations thereof) is from about 1:4 to about 4:1.

In accordance with the invention, contacting of a plasma-treated silicone hydrogel contact lens with a first aqueous coating solution of a poly(alkylacrylic acid) can occur by dipping it into the aqueous coating solution or by spraying it with the aqueous coating solution. One contacting process involves solely dipping the plasma-treated silicone hydrogel contact lens in a bath of a first aqueous coating solution for a period of time or alternatively dipping the plasma-treated silicone hydrogel contact lens sequentially in a series of bath of aqueous coating solutions for a fixed shorter time period for each bath. Another contacting process involves solely spray a first aqueous coating solution. However, a number of alternatives involve various combinations of spraying- and dipping-steps may be designed by a person having ordinary skill in the art. Preferably, the step of contacting is performed by dipping the plasma-treated silicone hydrogel contact lens in the first aqueous coating solution.

In accordance with the invention, poly(alkylacrylic acid) has a weight average molecular weight of at least 100,000 Daltons (preferably from 200,000 to 10,000,000 Daltons, more preferably from 300,000 to 5,000,000 Daltons, even more preferably from 400,000 to 3,000,000 Daltons). In accordance with the invention, the poly(alkylacrylic acid) is poly(methacrylic acid), polyethylacrylic acid, poly(methacrylic acid-co-ethacrylic acid), or a mixture thereof, preferably is poly(methacrylic acid).

In accordance with the invention, the pH of the first aqueous coating solution is from 2.3 to 5.0 (preferably from 2.5 to 4.8, more preferably from 2.8 to about 4.5) at the coating temperature; and the first aqueous coating solution includes one or more non-polymeric acids in a total amount (preferably in a total amount of about 1% by weight or less, more preferably in a total amount of about 0.75% by weight or less, even more preferably in a total amount of about 0.5% by weight or less, most preferably in a total amount of about 0.4% by weight) for not having an acid-induced change in elastic modulus, $\Delta E$, of greater than 15% (preferably greater than 10%, even more preferably greater than 7.5%, most preferably greater than 5%), wherein $$\Delta E = \left| \frac{E_i - E_0}{E_0} \right| \times 100\%$$

in which $E_i$ is the elastic modulus of the plasma-treated silicone hydrogel contact lens after being in contact with the first aqueous coating solution at the coating temperature for the contacting time and $E_o$ is the elastic modulus of the plasma-treated silicone hydrogel contact lens prior to contacting with the first aqueous coating solution.

A person skilled in the art knows how to prepare a first aqueous coating solution. For example, desired amounts of all the required components can be dissolved in purified water (e.g., distilled water or deionized water).

In accordance with the invention, the temperature of the first aqueous coating solution is preferably from about 40° C. to about 50° C.

In accordance with the invention, the contacting time is about 60 minutes or longer, preferably at least about 90 minutes or longer, more preferably from about 90 minutes to about 240 minutes, even more preferably from about 120 minutes to about 180 minutes. A person knows how to control the contacting time for obtaining a desired thickness of a layer of poly(alkylacrylic acid) on a silicone hydrogel contact lens with a plasma base coating thereon.

In a preferred embodiment, the plasma-treated silicone hydrogel contact lens is in a dry state immediately before being in contact with the first aqueous coating solution.

In another preferred embodiment, the plasma-treated silicone hydrogel contact lens is in fully-hydrated state immediately before being in contact with the first aqueous coating solution.

In accordance with the invention, a water-soluble and thermally-crosslinkable hydrophilic polymeric material comprises azetidinium groups and is a partial reaction product of at least one azetidinium-containing polymer with at least one hydrophilicity-enhancing agent (i.e., a wetting agent) having at least one carboxyl, primary amine, secondary amine, or thiol group, according to the crosslinking reactions shown in Scheme I Scheme I

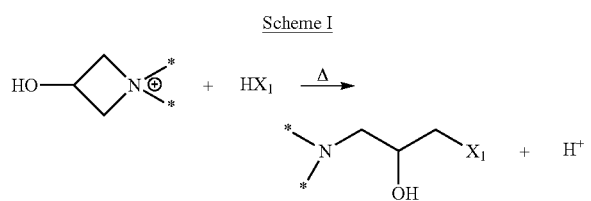

in which $X_1$ is —S—*, —OC(=O)—*, or —NR'—* in which R' is hydrogen or a $C_1$-$C_{20}$ unsubstituted or substituted alkyl group, and * represents an organic radical.

Any suitable azetidinium-containing polymers can be used in the invention. Examples of azetidinium-containing polymers includes without limitation epichlorohydrin-functionalized polyamines, homopolymers of an azetidinium-containing vinylic monomer, copolymers of an azetidinium-containing vinylic monomer with one or more vinylic monomers.

Preferably, an azetidinium-containing polymer is an epichlorohydrin-functionalized polyamine. An epichlorohydrin-functionalized polyamine can be obtained by reacting epichlorohydrin with a polyamine polymer or a polymer containing secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer; a homopolymer or copolymer of mono-alkylaminoalkyl (meth)acrylate or mono-alkylaminoalkyl (meth)acrylamide can also react with epichlorohydrin to form an epichlorohydrin-functionalized polyamine; a poly(2-oxazoline-co-ethyleneimine) copolymer can react with epichlorohydrin to form an epichlorohydrin-functionalized polyamine (i.e., a poly(2-oxazoline-co-ethyleneimine)-epichlorohydrin). The reaction conditions for epichlorohydrin-functionalization of a polyamine or polyamidoamine polymer are taught in EP1465931 (herein incorporated by reference in its entirety). A preferred epichlorohydrin-functionalized polyamine is polyamidoamine-epichlorohydrin (PAE) or a poly(2-oxazoline-co-ethyleneimine)-epichlorohydrin.

Polyamidoamine-epichlorohydrin is commercially available, such as, for example, Kymene® or Polycup® resins (epichlorohydrin-functionalized adipic acid-diethylenetriamine copolymers) from Hercules.

Poly(2-oxazoline-co-ethyleneimine)-epichlorohydrin can be prepared according to procedures described in U.S. Pat. Appl. Pub. No. US 2016/0061995 A1 (herein incorporated by reference in its entirety).

Homopolymers and copolymers of an azetidinium-containing vinylic monomer can be obtained according to the procedures described in U.S. Pat. Appl. Pub. No. 2013/0337160A1 (herein incorporated by reference in its entirety).

Any suitable hydrophilicity-enhancing agents can be used in the invention so long as they are ophthalmically compatible and contain at least one primary or secondary amino group, at least one carboxyl group, and/or at least one thiol group.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and primary amino-, secondary amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_{18}O_{13}NS$ $CO_2H$)—), or combinations thereof.

Another preferred class of hydrophilic polymers as hydrophilicity-enhancing agents include without limitation: poly(ethylene glycol) (PEG) with mono-amino (primary or secondary amino), carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino-(primary or secondary) or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof.

In accordance with the invention, reactive vinylic monomers can be carboxyl-containing vinylic monomers, primary amino-containing vinylic monomers, or secondary amino-containing vinylic monomers.

Examples of preferred carboxyl-containing vinylic monomers include without limitation acrylic acid, $C_1$-$C_4$ alkylacrylic acid (e.g., methacrylic ethylacrylic acid, propylacrylic acid, butylacrylic acid), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof.

Examples of preferred primary and secondary amino-containing vinylic monomers include without limitation amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, and combinations thereof.

In accordance with the invention, a non-reactive vinylic monomer is a vinylic monomer free of any carboxyl group, primary amino group, secondary amino group, epoxide group, isocyanate group, azlactone group, or aziridine group. Non-reactive vinylic monomers preferably are hydrophilic vinylic monomers, phosphorylcholine-containing vinylic monomers, or combinations thereof. Examples of preferred non-reactive hydrophilic vinylic monomers include without limitation (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl) methyl]-acryl-amide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof.

Examples of preferred non-reactive phosphorylcholine-containing vinylic monomers are described above.

More preferably, a hydrophilic polymer as a hydrophilicity-enhancing agent is PEG-$NH_2$; PEG-SH; PEG-COOH; $H_2N$-PEG-$NH_2$; HOOC-PEG-COOH; HS-PEG-SH; $H_2N$-PEG-COOH; HOOC-PEG-SH; $H_2N$-PEG-SH; multi-arm PEG with one or more primary or secondary amino, carboxyl or thiol groups; PEG dendrimers with one or more primary or secondary amino, carboxyl or thiol groups; a mono-(primary or secondary) amino-, monocarboxyl-, di(primary or secondary amino)- or dicarboxyl-terminated homo- or copolymer of a non-reactive hydrophilic vinylic monomer selected from the group consisting of (meth) acryamide, N-vinylpyrrolidone (NVP), N-vinyl-N-methyl acetamide, glycerol (meth)acrylate, hydroxyethyl (meth)acrylate, N-hydroxyethyl (meth)acrylamide, N-hydroxypropyl (meth)acrylamide, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha) crylamide, a phosphorylcholine-containing vinylic monomer, and combinations thereof; a copolymer which is a polymerization product of a composition comprising (1) from about 0.1% to about 30%, preferably from about 0.5% to about 20%, more preferably from about 1% to about 15%, by weight of acrylic acid, $C_1$-$C_3$ alkylacrylic acid, allylamine and/or amino-$C_2$-$C_4$ alkyl (meth)acrylate, and (2) at least one non-reactive hydrophilic vinylic monomer selected from the group consisting of acrylamide, N,N-dimethylacrylamide, N-vinylpyrrolidone, a phosphorylcholine-containing vinylic monomer, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

Most preferably, the hydrophilicity-enhancing agent as a hydrophilicity-enhancing agent is PEG-$NH_2$; PEG-SH; PEG-COOH; mono-(primary or secondary amino)-, monocarboxyl-, diamino- or dicarboxyl-terminated polyvinylpyrrolidone; mono-(primary or secondary amino)-, monocarboxyl-, di-(primary or secondary amino)- or dicarboxyl-terminated polyacrylamide; mono-(primary or secondary amino)-, monocarboxyl-, di-(primary or secondary amino)- or dicarboxyl-terminated poly(DMA); mono-(primary or secondary amino)- or monocarboxyl-, di-(primary or secondary amino)- or dicarboxyl-terminated poly(DMA-co-NVP); mono-(primary or secondary amino)-, monocarboxyl-, di-(primary or secondary amino)- or dicarboxyl-terminated poly(NVP-co-N,N-dimethylaminoethyl (meth) acrylate)); mono-(primary or secondary amino)-, monocarboxyl-, di-(primary or secondary amino)- or dicarboxyl-terminated poly(vinylalcohol); mono-(primary or secondary amino)-, monocarboxyl-, di-(primary or secondary amino)- or dicarboxyl-terminated poly[(meth)acryloyloxyethyl phosphrylcholine] homopolymer or copolymer; mono-(primary or secondary amino)-, monocarboxyl-, di-(primary or secondary amino)- or dicarboxyl-terminated poly(NVP-co-vinyl alcohol); mono-(primary or secondary amino)-, monocarboxyl-, di-(primary or secondary amino)- or dicarboxyl-terminated poly(N,N-dimethylacrylamide-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP) with from about 0.1% to about 30%, preferably from about 0.5% to about 20%, more preferably from about 1% to about 15%, by weight of (meth)acrylic acid; a copolymer which is a polymerization product of a composition comprising (1) a phosphorylcholine-containing vinylic monomer and (2) from about 0.1% to about 30%, preferably from about 0.5% to about 20%, more preferably from about 1% to about 15%, by weight of acrylic acid, $C_1$-$C_3$ alkylacrylic acid, allylamine and/or amino-$C_2$-$C_4$alkyl (meth)acrylate; and combination thereof.

PEGs with functional groups and multi-arm PEGs with functional groups can be obtained from various commercial suppliers, e.g., Polyscience, and Shearwater Polymers, inc., etc.

Mono-(primary or secondary amino)-, monocarboxyl-, di-(primary or secondary amino)- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a di-(primary or secondary amino)- or dicarboxyl-terminated homo- or co-polymer of a non-reactive hydrophilic vinylic monomer, the non-reactive vinylic monomer, a chain transfer agent with a primary or secondary amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having a primary or secondary amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with primary or secondary amino or carboxyl group is used to control the molecular weight of the resultant hydrophilic polymer and forms a terminal end of the resultant hydrophilic polymer so as to provide the resultant hydrophilic polymer with one terminal primary or secondary amino or carboxyl group, while the reactive vinylic monomer provides the other terminal carboxyl or primary or secondary amino group to the resultant hydrophilic polymer. Similarly, to prepare a mono-(primary or secondary amino)- or monocarboxyl-terminated homo- or co-polymer of a non-reactive hydrophilic vinylic monomer, the non-reactive vinylic monomer, a chain transfer agent with a primary or secondary amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOF Corporation (e.g., LIPIDURE®-A and -AF).

The weight average molecular weight $M_w$ of the hydrophilic polymer having at least one (primary or secondary) amino, carboxyl or thiol group (as a hydrophilicity-enhancing agent) is preferably from about 500 to about 5,000,000, more preferably from about 1,000 to about 2,000,000, even more preferably from about 5,000 to about 1,000,000 Daltons.

Water-soluble and thermally-crosslinkable hydrophilic polymeric materials can be prepared according to the processes disclosed in U.S. Pat. Appli. Pub. Nos. US 2016/0061995 A1 and US2013/0337160 A1 (herein incorporated by reference in their entireties) and in U.S. Pat. No. 8,529,057 (herein incorporated by reference in its entirety).

In a preferred embodiment, a water-soluble thermally-crosslinkable polymeric material can be obtained by heating an aqueous reactive solution, which comprises at least one azetidinium-containing polymer and at least one hydrophilicity-enhancing agent (i.e., a wetting agent) having at least one reactive functional group selected from the group consisting of primary amino group, secondary amino group, carboxyl group, thiol group, and a combination thereof, to a temperature of from about 35° C. to about 85° C. and maintaining the temperature for a period of time sufficient (about 6 hours or less, preferably about 5 hours, more preferably from about 2 hour to about 4 hours). The aqueous reactive solution preferably comprises from about 70 mM to about 170 mM (preferably about 90 mM to about 150 mM, more preferably from about 100 mM to about 130 mM) of one or more ionic compounds and a pH of at least 8.0 (preferably at least 8.5, more preferably at least 9.0, even more preferably at least 9.5). It should be understood that the reaction time should be long enough to covalently attach the hydrophilicity-enhancing agent onto the polymer chain of the azetidinium-containing polymer, but should be short enough not to consume all the azetidinium groups of the azetidinium-containing polymer and not to form a gel (i.e., not water-soluble) due to the too many crosslinkages formed between the azetidinium-containing polymer and the hydrophilicity-enhancing agent. A resultant polymeric material is a lightly-crosslinked polymeric material which has a highly-branched structure and still comprises thermally-crosslinkable azetidinium groups.

A person skilled in the art understands well how to adjust the pH of the reactive mixture, e.g., by adding a base (e.g., NaOH, KOH, NH$_4$OH, or mixture thereof) or an acid (e.g., HCl, H$_2$SO$_4$, H$_3$PO$_4$, citric acid, acetic acid, boric acid, or mixture thereof).

In accordance with the invention, any ionic compounds can be used in the reactive mixture. Preferably, ionic compounds are those used as ionic tonicity-adjusting agents and ionic buffering agents used in an ophthalmic solutions. Examples of preferred ionic tonicity-adjusting agents includes without limitation sodium chloride, potassium chloride, and combinations thereof. Examples of preferred ionic buffering agents includes various salts of phosphoric acid (e.g. NaH$_2$PO$_4$, Na$_2$HPO$_4$, Na$_3$PO$_4$, KH$_2$PO$_4$, K$_2$HPO$_4$, K$_3$PO$_4$, or mixtures thereof), various salts of boric acid (e.g., sodium borate, potassium borate, or mixture thereof), various salts of citric acid (e.g., monosodium citrate, disodium citrate, trisodium citrate, monopotassium citrate, dipotassium citrate, tripotassium citrate, or mixtures thereof), various salts of carbonic acid (e.g., Na$_2$CO$_3$, NaHCO$_3$, K$_2$CO$_3$, KHCO$_3$, or mixture thereof).

The aqueous reactive solution for preparing a water-soluble thermally-crosslinkable polymeric material can be prepared by dissolving a desired amount of an azetidinium-containing polymer, a desired amount of a hydrophilicity-enhancing agent with at least one reactive functional group, and desired amounts of other components (e.g., ionic buffering agents, ionic tonicity-adjusting agents, etc.) in water (or a mixture of water and a minority amount of a water-soluble organic solvent) to form an aqueous solution and then adjusting the pH of the aqueous solution if necessary.

In accordance with the invention, the concentration ratio of a hydrophilicity-enhancing agent relative to an azetidinium-containing polymer in the aqueous reactive solution must be selected not to render a resultant water-soluble thermally-crosslinkable polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the azetidinium-containing polymer.

In a preferred embodiment, the aqueous reactive solution comprises from 0.01% to about 10% by weight (preferably from 0.05% to about 5% by weight, more preferably from 0.08% to about 1% by weight, even more preferably from 0.1% to about 0.4% by weight) of an azetidinium-containing polymer and from about 0.01% to about 10% by weight (preferably from 0.02% to about 5% by weight, more preferably from 0.05% to about 2% by weight, even more preferably from 0.08% to about 1.0% by weight) of a hydrophilicity-enhancing agent having at least one reactive function group (carboxyl, primary amino, secondary amino group), the concentration ratio of the azetidinium-containing polymer to the hydrophilicity-enhancing agent is from about 1000:1 to 1:1000 (preferably from about 500:1 to about 1:500, more preferably from about 250:1 to about 1:250, even more preferably from about 100:1 to about 1:100).

In a preferred embodiment, the water-soluble thermally-crosslinkable polymeric material
comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of primary amino group, secondary amino group, carboxyl group, thiol group, and combination thereof (preferably carboxyl groups), wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one primary or secondary amino, carboxyl or thiol group of the hydrophilicity-enhancing agent, and (iii) azetidinium groups which are parts of the first polymer chains or pendant or terminal groups covalently attached to the first polymer chains. The composition of a chemically-modified poly(2-oxazoline-co-ethyleneimine)-epichlorohydrin or a chemically-modified polyamidoamine-epichlorohydrin is determined by the composition (based on the total weight of the reactants) of a reactant mixture used for such a polymer according to the crosslinking reactions shown in Scheme I above. For example, if a reactant mixture comprises about 75% by weight of a polyamidoamine-epichlorohydrin and about 25% by weight of at least one hydrophilicity-enhancing agent based on the total weight of the reactants, then the resultant chemically-modified polyamidoamine-epichlorohydrin comprises about 75% by weight of first polymer chains derived from the polyamidoamine-epichlorohydrin and about 25% by weight of hydrophilic moieties or second polymer chains derived from said at least one hydrophilicity-enhancing agent.

In accordance with the invention, the soft contact lens precursor (i.e., a silicone hydrogel contact lens with the plasma base coating thereon and a layer of poly(alkylacrylic acid) on top of the plasma base coating) is heated in a second aqueous coating solution which comprises a water-soluble and thermally-crosslinkable hydrophilic polymeric material having azetidinium groups and optionally (but preferably) primary or secondary amino or carboxyl groups, at a temperature of from about 60° C. to about 140° C. for a time period to crosslink the water-soluble thermally-crosslinkable hydrophilic polymeric material and the poly(alkylacrylic acid) so as to form a soft contact lens having a composite coating which comprises a plasma base coating and a hydrogel coating on top of the plasma base coating, wherein the soft contact lens has a friction rating of 2 or less.

Preferably, the step of heating is performed by autoclaving the soft contact lens precursor immersed in the second aqueous coating solution which is a packaging solution (i.e., a buffered aqueous solution with a pH of from 6.7 to 7.6) in a sealed lens package at a temperature of from about 115° C. to about 125° C. for approximately 20-90 minutes. It is believed that during autoclave those azetidinium groups which do not participate in crosslinking reaction may be hydrolyzed into 2,3-dihydroxypropyl (HO—$CH_2$—CH (OH)—$CH_2$—) groups and that the azetidinium-containing polymeric material present in the lens packaging solution, if applicable, can be converted to a non-reactive polymeric wetting agent capable of improving a lens's insert comfort. Consequently, the second aqueous coating solution is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6.5 to about 7.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N, N'-bis(2-ethanesulfonic acid), TES (N-[Tris (hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. Preferably, the buffering agents are phosphate buffers, borate buffers, or combinations thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

In accordance with the invention, the obtained soft contact lens in fully hydrated state has a friction rating of about 2 or lower (preferably about 1.5 or lower, more preferably about 1.0 or lower, even more preferably about 0.5 or lower) after 7 cycles of manual rubbing test.

In another aspect, the invention provides a soft contact lens produced according to a method of the invention. The soft contact lens of the invention comprises: a silicone hydrogel lens body (i.e., a silicone hydrogel substrate having a 3-dimensional shape of a contact lens) which is essentially made of a silicone hydrogel material; and a composite coating thereon, wherein the composite coating comprises a plasma base coating, an anchor layer of poly(alkylacrylic acid) on top of the plasma base coating, and a hydrogel layer which is covalently attached onto the anchor layer, wherein the plasma base coating has a thickness of from about 0.5 nm to about 40 nm (preferably from about 1 nm to about 35 nm, more preferably from about 2 nm to about 30 nm, even more preferably from about 3 nm to about 25 nm), wherein the poly(alkylacrylic acid)polymer is a homopolymer or copolymer of methacrylic acid, ethyl acrylic acid or 2-(meth)acrylamidoglycolic acid, wherein the soft contact lens in a fully-hydrated state has a friction rating of about 2 or lower (preferably about 1.5 or lower, more preferably about 1.0 or lower, even more preferably about 0.5 or lower) after 7 cycles of manual rubbing test and an oxygen permeability of at least about 40 barrers (preferably at least about 60 barrers, more preferably at least about 80 barrers, even more preferably at least about 100 barrers).

All the various embodiments described above of silicone hydrogel materials and polymerizable components for making silicone hydrogel materials are incorporated in this aspect of the invention.

A soft contact lens of the invention, in a fully hydrated state, further has at least one property selected from the group consisting of: a WBUT of at least about 10 seconds (preferably at least about 12.5 seconds, more preferably at least about 15 seconds, even more preferably at least about 17.5 seconds); a water contact angle of about 80 degrees or less (preferably about 70 degrees or less, more preferably about 60 degrees or less, even more preferably about 50 degrees or less); an elastic modulus of about 1.5 MPa or less (preferably from about 0.1 MPa to about 1.2 MPa or less, more preferably from about 0.15 MPa to about 1.1 or less, even more preferably from about 0.2 MPa to about 1.0 MPa); a water content of from about 15% to about 70%, preferably from about 20% to about 65%, more preferably from about 25% to about 60%, even more preferably from about 30% to about 55% by weight when fully hydrated; and combinations thereof.

The water content of a silicone hydrogel contact lens can be measured according to Bulk Technique as disclosed in U.S. Pat. No. 5,849,811.

A silicone hydrogel substrate is a preformed silicone hydrogel contact lens. All the embodiments of a silicone hydrogel contact lens described above are incorporated in this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing soft contact lenses, comprising the steps of:
(1) obtaining a plasma-treated silicone hydrogel contact lens having a silicone hydrogel lens body (i.e., a silicone hydrogel substrate having a 3-dimensional shape of a contact lens) and a plasma base coating thereon, wherein the silicone hydrogel lens body is essentially made of a silicone hydrogel material, wherein the plasma base coating has a thickness of from about 0.5 nm to about 40 nm;
(2) contacting the plasma-treated silicone hydrogel contact lens with a first aqueous coating solution including a poly(alkylacrylic acid) polymer at a coating temperature of at least 40° C. or higher for a contacting time of from about 60 minutes to about 300 minutes to form a soft contact lens precursor which is the plasma-treated silicone hydrogel contact lens additionally having a layer of poly(alkylacrylic acid) on top of the plasma base coating, wherein the first aqueous coating solution has a pH from 2.3 to 5.0 at the coating temperature and the poly(alkylacrylic acid)polymer is a homopolymer or copolymer of acrylic acid, methacrylic acid, ethyl acrylic acid or 2-(meth)acrylamidoglycolic acid, provided that the first aqueous coating solution includes one or more non-polymeric acids in a total amount for having an acid-induced change in elastic modulus, $\Delta E$, of not greater than 15%, wherein $$\Delta E = \left|\frac{E_i - E_0}{E_0}\right| \times 100\%$$

in which $E_i$ is the elastic modulus of the plasma-treated silicone hydrogel contact lens after being in contact with the first aqueous coating solution at the coating temperature for the contacting time and $E_o$ is the elastic modulus of the plasma-treated silicone hydrogel contact lens prior to contacting with the first aqueous coating solution; and
(3) heating the soft contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the poly(alkylacrylic acid) polymer so as to form the soft contact lens with the composite coating thereon, wherein the composite coating comprise the plasma base coating and a hydrogel coating on top of the plasma base coating, wherein the soft contact lens in fully hydrated state has a friction rating of about 2 or lower after 7 cycles of manual rubbing test.

2. The method of invention 1, wherein the coating temperature is from about 40° C. to about 50° C.

3. The method of invention 1 or 2, wherein the contacting time is from about 70 minutes to about 240 minutes.

4. The method of invention 1 or 2, wherein the contacting time is from about 80 minutes to about 210 minutes.

5. The method of invention 1 or 2, wherein the contacting time is from about 90 minutes to about 180 minutes.

6. The method of any one of inventions 1 to 5, wherein the first aqueous coating solution has a pH from 2.5 to 4.8 at the coating temperature.

7. The method of any one of inventions 1 to 5, wherein the first aqueous coating solution has a pH from 2.5 to about 4.5 at the coating temperature.

8. The method of any one of inventions 1 to 7, wherein the first aqueous coating solution includes one or more non-polymeric acids in a total amount of about 1% by weight or less.

9. The method of any one of inventions 1 to 7, wherein the first aqueous coating solution includes one or more non-polymeric acids in a total amount of about 0.75% by weight or less.

10. The method of any one of inventions 1 to 7, wherein the first aqueous coating solution includes one or more non-polymeric acids in a total amount of about 0.5% by weight or less.

11. The method of any one of inventions 1 to 7, wherein the first aqueous coating solution includes one or more non-polymeric acids in a total amount of about 0.4% by weight.

12. The method of any one of inventions 1 to 11, wherein the acid-induced change in elastic modulus, $\Delta E$, is not greater than 10%.

13. The method of any one of inventions 1 to 11, wherein the acid-induced change in elastic modulus, $\Delta E$, is not greater than 7.5%.

14. The method of any one of inventions 1 to 11, wherein the acid-induced change in elastic modulus, $\Delta E$, is not greater than 5%.

15. The method of any one of inventions 1 to 14, wherein the plasma-treated silicone hydrogel contact lens is obtained by treating a silicone hydrogel contact lens in dried state with a plasma generated in a plasma gas (i.e., an atmosphere) compose of a mixture of a $C_1$-$C_6$ hydrocarbon and a secondary gas selected from the group consisting of air, $N_2$, $O_2$, $CO_2$, and combinations thereof.

16. The method of any one of inventions 1 to 14, wherein the plasma-treated silicone hydrogel contact lens is obtained by treating a silicone hydrogel contact lens in dried state with a plasma generated in a plasma gas compose of a mixture of a $C_1$-$C_4$ hydrocarbon and a secondary gas selected from the group consisting of air, $N_2$, $O_2$, $CO_2$, and combinations thereof.

17. The method of any one of inventions 1 to 14, wherein the plasma-treated silicone hydrogel contact lens is obtained by treating a silicone hydrogel contact lens in dried state with a plasma generated in a plasma gas compose of a mixture of methane and a secondary gas selected from the group consisting of air, $N_2$, $O_2$, $CO_2$, and combinations thereof.

18. The method of any one of inventions 1 to 17, wherein the plasma-treated silicone hydrogel contact lens is in a dry state immediately before being in contact with the first aqueous coating solution.

19. The method of any one of inventions 1 to 17, wherein the plasma-treated silicone hydrogel contact lens is in fully hydrated state immediately before being in contact with the first aqueous coating solution.

20. The method of any one of inventions 1 to 19, wherein the step of heating is performed by autoclaving the soft contact lens precursor immersed in the second aqueous coating solution in a sealed lens package at a temperature of from about 115° C. to about 125° C. for approximately 20-90 minutes, wherein the second aqueous coating solution is a buffered aqueous solution with a pH of from 6.7 to 7.6.

21. A soft contact lens produced according to a method of any one of inventions 1 to 56.

22. A soft contact lens, comprising: a silicone hydrogel lens body (i.e., a silicone hydrogel substrate having a 3-dimensional shape of a contact lens) which is essentially made of a silicone hydrogel material; and a composite coating thereon, wherein the composite coating comprises a plasma base coating substantially free of cracks, an anchor layer of poly(alkylacrylic acid) on top of the plasma base coating, and a hydrogel layer which is covalently attached onto the anchor layer, wherein the plasma base coating has a thickness of from about 0.5 nm to about 40 nm, wherein the poly(alkylacrylic acid)polymer is a homopolymer or copolymer of acrylic acid, methacrylic acid, ethyl acrylic acid or 2-(meth)acrylamidoglycolic acid, wherein the soft contact lens in a fully-hydrated state has a friction rating of about 2 or lower after 7 cycles of manual rubbing test and an oxygen permeability of at least about 40 barrers.

23. The soft contact lens of invention 22, wherein the hydrogel layer is derived from a water-soluble polymeric material comprising reactive functional groups selected from the group consisting of azetidinium groups, carboxyl groups, primary amino groups, secondary amino groups, thiol groups, and combinations thereof.

24. The method of any one of inventions 1 to 20 or the soft contact lens of any one of inventions 22 to 23, wherein the plasma base coating has a thickness of from about 1 nm to about 35 nm.

25. The method of any one of inventions 1 to 20 or the soft contact lens of any one of inventions 22 to 23, wherein the plasma base coating has a thickness of from about 2 nm to about 30 nm.

26. The method of any one of inventions 1 to 20 or the soft contact lens of any one of inventions 22 to 23, wherein the plasma base coating has a thickness of from about 3 nm to about 25 nm.

27. The method of any one of inventions 1-20 and 24-26 or the soft contact lens of any one of inventions 21-26, wherein the soft contact lens in fully hydrated state has a friction rating of about 1.5 or lower after 7 cycles of manual rubbing test.

28. The method of any one of inventions 1-20 and 24-26 or the soft contact lens of any one of inventions 21-26, wherein the soft contact lens in fully hydrated state has a friction rating of about 1.0 or lower after 7 cycles of manual rubbing test.

29. The method of any one of inventions 1-20 and 24-26 or the soft contact lens of any one of inventions 21-26, wherein the soft contact lens in fully hydrated state has a friction rating of about 0.5 or lower after 7 cycles of manual rubbing test.

30. The method of any one of inventions 1-20 and 24-29 or the soft contact lens of any one of inventions 21-29, wherein the soft contact lens in a fully-hydrated state has an oxygen permeability of at least about 60 barrers.

31. The method of any one of inventions 1-20 and 24-29 or the soft contact lens of any one of inventions 21-29, wherein the soft contact lens in a fully-hydrated state has an oxygen permeability of at least about 80 barrers.

32. The method of any one of inventions 1-20 and 24-29 or the soft contact lens of any one of inventions 21-29, wherein the soft contact lens in a fully-hydrated state has an oxygen permeability of at least about 100 barrers.

33. The method of any one of inventions 1-20 and 24-32 or the soft contact lens of any one of inventions 21-32, wherein the soft contact lens in a fully-hydrated state further has a WBUT of at least about 10 seconds.

34. The method of any one of inventions 1-20 and 24-32 or the soft contact lens of any one of inventions 21-32, wherein the soft contact lens in a fully-hydrated state further has a WBUT of at least about 12.5 seconds.

35. The method of any one of inventions 1-20 and 24-32 or the soft contact lens of any one of inventions 21-32, wherein the soft contact lens in a fully-hydrated state further has a WBUT of at least about 15 seconds.

36. The method of any one of inventions 1-20 and 24-32 or the soft contact lens of any one of inventions 21-32, wherein the soft contact lens in a fully-hydrated state further has a WBUT of at least about 17.5 seconds.

37. The method of any one of inventions 1-20 and 24-36 or the soft contact lens of any one of inventions 21-36, wherein the soft contact lens in a fully-hydrated state further has a water contact angle of about 80 degrees or less.

38. The method of any one of inventions 1-20 and 24-36 or the soft contact lens of any one of inventions 21-36, wherein the soft contact lens in a fully-hydrated state further has a water contact angle of about 70 degrees or less.

39. The method of any one of inventions 1-20 and 24-36 or the soft contact lens of any one of inventions 21-36, wherein the soft contact lens in a fully-hydrated state further has a water contact angle of about 60 degrees or less.

40. The method of any one of inventions 1-20 and 24-36 or the soft contact lens of any one of inventions 21-36, wherein the soft contact lens in a fully-hydrated state further has a water contact angle of about 50 degrees or less.

41. The method of any one of inventions 1-20 and 24-40 or the soft contact lens of any one of inventions 21-40, wherein the soft contact lens in a fully-hydrated state further has an elastic modulus of about 1.5 MPa or less.

42. The method of any one of inventions 1-20 and 24-40 or the soft contact lens of any one of inventions 21-40, wherein the soft contact lens in a fully-hydrated state further has an elastic modulus of from about 0.1 MPa to about 1.2 MPa or less.

43. The method of any one of inventions 1-20 and 24-40 or the soft contact lens of any one of inventions 21-40, wherein the soft contact lens in a fully-hydrated state further has an elastic modulus of from about 0.15 MPa to about 1.1 MPa or less.

44. The method of any one of inventions 1-20 and 24-40 or the soft contact lens of any one of inventions 21-40, wherein the soft contact lens in a fully-hydrated state further has an elastic modulus of from about 0.2 MPa to about 1.0 MPa.

45. The method of any one of inventions 1-20 and 24-44 or the soft contact lens of any one of inventions 21-44, wherein the soft contact lens in a fully-hydrated state further has a water content of from about 15% to about 70% by weight when fully hydrated.

46. The method of any one of inventions 1-20 and 24-44 or the soft contact lens of any one of inventions 21-44, wherein the soft contact lens in a fully-hydrated state further has a water content of from about 20% to about 65% by weight when fully hydrated.

47. The method of any one of inventions 1-20 and 24-44 or the soft contact lens of any one of inventions 21-44, wherein the soft contact lens in a fully-hydrated state further has a water content of from about 25% to about 60% by weight when fully hydrated.

48. The method of any one of inventions 1-20 and 24-44 or the soft contact lens of any one of inventions 21-44, wherein the soft contact lens in a fully-hydrated state further has a water content of from about 30% to about 55% by weight when fully hydrated.

49. The method of any one of inventions 1-20 and 24-48 or the soft contact lens of any one of inventions 21-48, wherein the plasma base coating is free of cracks.

50. The method of any one of inventions 1-20 and 24-49 or the soft contact lens of any one of inventions 21-49, wherein the poly(alkylacrylic acid) has a weight average molecular weight of at least 100,000 Daltons.

51. The method of any one of inventions 1-20 and 24-49 or the soft contact lens of any one of inventions 21-49, wherein the poly(alkylacrylic acid) has a weight average molecular weight of from 200,000 to 10,000,000 Daltons.

52. The method of any one of inventions 1-20 and 24-49 or the soft contact lens of any one of inventions 21-49, wherein the poly(alkylacrylic acid) has a weight average molecular weight of from 300,000 to 5,000,000 Daltons.

53. The method of any one of inventions 1-20 and 24-49 or the soft contact lens of any one of inventions 21-49, wherein the poly(alkylacrylic acid) has a weight average molecular weight of from 400,000 to 3,000,000 Daltons.

54. The method of any one of inventions 1-20 and 24-53 or the soft contact lens of any one of inventions 21-53, wherein the poly(alkylacrylic acid) polymer is a homopolymer of acrylic acid or methacrylic acid.

55. The method of any one of inventions 1-20 and 24-53 or the soft contact lens of any one of inventions 21-53, wherein the poly(alkylacrylic acid) polymer is a homopolymer of ethyl acrylic acid or 2-(meth)acrylamidoglycolic acid.

56. The method of any one of inventions 1-20 and 24-53 or the soft contact lens of any one of inventions 21-53, wherein the poly(alkylacrylic acid) polymer is a copolymer of acrylic acid with any one of methacrylic acid, ethyl acrylic acid, and 2-(meth)acrylamidoglycolic acid.

57. The method of any one of inventions 1-20 and 24-56 or the soft contact lens of any one of inventions 21 and 23-56, wherein the water-soluble polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties each derived from at least one first hydrophilicity-enhancing agent having at least one reactive functional group selected from the group consisting of primary amino group, secondary amino group, carboxyl group, thiol group, and combinations thereof, wherein the hydrophilic moieties are covalently attached to the first polymer chains through one or more covalent linkages each formed between one azetidinium group and one primary or secondary amino, carboxyl or thiol group of the first hydrophilicity-enhancing agent, and (iii) azetidinium groups which are parts of the first polymer chains or pendant or terminal groups covalently attached to the first polymer chains.

58. The method of any one of inventions 1-20 and 24-56 or the soft contact lens of any one of inventions 21 and 23-56, wherein the water-soluble polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of second polymer chains each derived from at least one second hydrophilicity-enhancing agent having at least one reactive functional group selected from the group consisting of primary amino group, secondary amino group, carboxyl group, thiol group, and combinations thereof, wherein the second polymer chains are covalently attached to the first polymer chains through one or more covalent linkages each formed between one azetidinium group and one primary amino, secondary amino, carboxyl or thiol group of the second hydrophilicity-enhancing agent, and
(iii) azetidinium groups which are parts of the first polymer chains or pendant or terminal groups covalently attached to the first polymer chains.

59. The method or the soft contact lens of invention 57, wherein the first hydrophilicity-enhancing agent is a primary amine-containing monosaccharide, a secondary amine-containing monosaccharide, a carboxyl-containing monosaccharide, a thiol-containing monosaccharide, a primary amine-containing disaccharide, a secondary amine-containing disaccharide, a carboxyl-containing disaccharide, a thiol-containing disaccharide, a primary amine-containing oligosaccharide, a secondary amine-containing oligosaccharide, a carboxyl-containing oligosaccharide, or a thiol-containing oligosaccharide, or a combination thereof.

60. The method or the soft contact lens of invention 58, wherein the second hydrophilicity-enhancing agent is: a polyethylene glycol having one sole primary or secondary amino, carboxyl or thiol group; a polyethylene glycol with two terminal primary or secondary amino, carboxyl and/or thiol groups; a multi-arm polyethylene glycol with one or more primary or secondary amino, carboxyl and/or thiol groups; or a polyethylene glycol dendrimer with one or more primary or secondary amino, carboxyl and/or thiol groups.

61. The method or the soft contact lens of invention 58, wherein the second hydrophilicity-enhancing agent is a copolymer which is a polymerization product of a composition comprising (1) about 60% or less by weight of one or more reactive vinylic monomers and (2) one or more non-reactive hydrophilic vinylic monomers.

62. The method or the soft contact lens of invention 61, wherein said one or more reactive vinylic monomers are vinylic monomers having a carboxyl group.

63. The method or the soft contact lens of invention 62, wherein said one or more reactive vinylic monomers are selected from the group consisting of acrylic acid, $C_1$-$C_4$ alkylacrylic acid (e.g., methacrylic ethylacrylic acid, propylacrylic acid, butylacrylic acid), N-2-(meth)acrylamidoglycolic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, tricarboxy ethylene, and combinations thereof.

64. The method or the soft contact lens of invention 62, wherein said one or more reactive vinylic monomers are acrylic acid, methylacrylic acid, or combinations thereof.

65. The method or the soft contact lens of invention 61, wherein said one or more reactive vinylic monomers are vinylic monomers having a primary or secondary amino group.

66. The method or the soft contact lens of invention 65, wherein said one or more reactive vinylic monomers are amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, and combinations thereof.

67. The method or the soft contact lens of any one of inventions 61 to 66, wherein said one or more non-reactive vinylic monomers are selected from the group consisting of a phosphorylcholine-containing vinylic monomer, (meth) acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth) acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth) acrylate having a weight average molecular weight of up to 1500 Daltons, allyl alcohol, vinyl alcohol, and combinations thereof.

68. The method or the soft contact lens of any one of inventions 61 to 66, wherein said one or more non-reactive vinylic monomers are selected from the group consisting of acrylamide, N,N-dimethylacrylamide, N-vinylpyrrolidone, N-vinyl-N-methyl acetamide, glycerol (meth)acrylate, hydroxyethyl (meth)acrylate, N-2-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

69. The method or the soft contact lens of any one of inventions 61 to 66, wherein said one or more non-reactive vinylic monomers are phosphorylcholine-containing vinylic monomers.

70. The method or the soft contact lens of invention 69, wherein said one or more non-reactive vinylic monomers are (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio) ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy) hexyl-2'-(trimethylammonio)-ethylphosphate, 2-((meth) acryloyloxy)ethyl-2'-(triethylammonio)ethyl-phosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy) butyl-2'-(trimethylammonio) ethylphosphate, 2-((meth) acryloyloxy) pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)-ethylphosphate, 2-(allyloxycarbonylamino)ethyl-2'-(trimethylammonio) ethyl phosphate, 2-(butenoyloxy)ethyl-2'-(trimethylammonio)ethylphosphate, or combinations thereof.

71. The method or the soft contact lens of any one of inventions 61 to 70, wherein the composition comprises about 50% or less by weight of said one or more reactive vinylic monomers.

72. The method or the soft contact lens of any one of inventions 61 to 70, wherein the composition comprises from about 0.1% to about 30% by weight of said one or more reactive vinylic monomers.

73. The method or the soft contact lens of any one of inventions 61 to 70, wherein the composition comprises from about 0.5% to about 20% by weight of said one or more reactive vinylic monomers.

74. The method or the soft contact lens of any one of inventions 61 to 70, wherein the composition comprises from about 1% to about 15% by weight of said one or more reactive vinylic monomers.

75. The method or the soft contact lens of invention 58, wherein the second hydrophilicity-enhancing agent is a primary amine-containing polysaccharide, a secondary amine-containing polysaccharide, a carboxyl-containing polysaccharide, hyaluronic acid, chondroitin sulfate, or a combination thereof.

76. The method or the soft contact lens of any one of inventions 58 to 86, wherein the silicone hydrogel material comprises repeating units of at least one polysiloxane vinylic monomer.

77. The method of any one of inventions 1-20 and 24-76 or the soft contact lens of any one of inventions 21 to 76, wherein the silicone hydrogel material comprises repeating units of at least one polysiloxane vinylic crosslinker.

78. The method of any one of inventions 1-20 and 24-77 or the soft contact lens of any one of inventions 21 to 77, wherein the silicone hydrogel material comprises repeating units of at least one polycarbosiloxane vinylic monomer.

79. The method of any one of inventions 1-20 and 24-78 or the soft contact lens of any one of inventions 21 to 78, wherein the silicone hydrogel material comprises repeating units of at least one polycarbosiloxane vinylic crosslinker.

80. The method of any one of inventions 1-20 and 24-79 or the soft contact lens of any one of inventions 21 to 79, wherein the silicone hydrogel material comprises repeating units of at least one silicone-containing vinylic monomer having a bis(trialkylsilyloxy)alkylsilyl or tris(trialkylsilyloxy)silyl group.

81. The method of any one of inventions 1-20 and 24-80 or the soft contact lens of any one of inventions 21 to 80, wherein the silicone hydrogel material comprises repeating units of at least one hydrophilic vinylic monomer.

82. The method of any one of inventions 1-20 and 24-81 or the soft contact lens of any one of inventions 21 to 80, wherein the silicone hydrogel material comprises repeating units of at least one hydrophilic N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof.

83. The method of any one of inventions 1-20 and 24-82 or the soft contact lens of any one of inventions 21 to 82, wherein the silicone hydrogel material comprises repeating units of at least one hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof.

84. The method of any one of inventions 1-20 and 24-83 or the soft contact lens of any one of inventions 21 to 83, wherein the silicone hydrogel material comprises repeating units of at least one alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

85. The method of any one of inventions 1-20 and 24-84 or the soft contact lens of any one of inventions 21 to 84, wherein the silicone hydrogel material comprises repeating units of at least one methylene-containing ($=CH_2$) pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

86. The method of any one of inventions 1-20 and 24-85 or the soft contact lens of any one of inventions 21 to 85, wherein the silicone hydrogel material comprises repeating units of at least one vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

87. The method of any one of inventions 1-20 and 24-86 or the soft contact lens of any one of inventions 21 to 86, wherein the silicone hydrogel material comprises repeating units of at least one allyl ether monomer selected from the group consisting of allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

88. The method of any one of inventions 1-20 and 24-87 or the soft contact lens of any one of inventions 21 to 87, wherein the silicone hydrogel material comprises repeating units of at least one $C_1$-$C_4$ alkoxyethoxy-containing monomer selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

89. The method of any one of inventions 1-20 and 24-88 or the soft contact lens of any one of inventions 21 to 88, wherein the silicone hydrogel material comprises repeating units of at least one phosphorylcholine-containing vinylic monomer selected from the group consisting of (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy) propyl-2'-(trimethylammonio) ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloyl-amino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy) ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosposphate, 2-(allyloxy)ethyl-2'-(trimethylammonio)ethylphosphate, 2-(vinyloxycarbonyl)ethyl-2'-(trimethylammonio) ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio) ethyl phosphate, 2-(butenoyloxy)ethyl-2'-(trimethylammonio)ethylphosphate, and combinations thereof.

90. The method of any one of inventions 1-20 and 24-89 or the soft contact lens of any one of inventions 21 to 89, wherein the silicone hydrogel material comprises repeating units of at least one non-silicone vinylic crosslinker selected from the group consisting of ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis (meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, and combinations thereof (preferably from the group consisting of tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof).

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Manually Rubbing Tests

The lenses are manually rubbed according to product insert with RENU® multi-purpose lens care solution (or another multi-purpose lens care solution) for 20 seconds and placed back to the lens case containing fresh lens care solution. The above procedure is repeated for a given times, e.g., from 1 to 30 times, (i.e., number of repetitions of manually rubbing tests which imitate cleaning and soaking cycles). As used in this application, the term "ix cycles" (e.g., 7× cycled) means i times of manual rubbing (e.g., 7 times) of repetitions of manual rubbing tests described above for imitating cleaning and soaking cycles.

Lubricity Evaluation.

The lubricity of a lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

The finger lubricities (i.e., friction ratings) of a contact lens can be determined either directly out-of-pack (OOP) but after ≥30 min soaking in PBS) or after i cycles (e.g., 7 cycles) of manual rubbing according to the procedures described above (AiCMR).

Coating Intactness Tests.

The intactness of a coating on the surface of a contact lens can be tested according to Sudan Black stain test as follow. Contact lenses with a coating (an LbL coating, a plasma coating, or any other coatings) are dipped into a Sudan Black dye solution (Sudan Black in the mixture ~80% mineral oil and ~20% vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated. Visible fine lines on lens surface may indicate the presence of cracking of the crosslinked coatings. Such test may be conducted from out-of-pack, and lenses after upon manual rubbing test.

Example 2

Unless otherwise stated, all chemicals are used as received.

Synthesis of Macromer 51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way is completely colourless and clear. It can be stored in air at room temperature for several months in the absence of light without any change in molecular weight.

Lens Preparation

A lens formulation is prepared as follows. 26 g of the macromer prepared above are added to a clean container. 19 g of 3-tris(trimethylsiloxy)silylpropyl methacrylate (TRIS from Shin-Etsu, product No. KF-2801) are added, followed by 1.00 gm of photoinitiator Darocur® 1173 (Ciba). 28.88 g dimethylacrylamide (DMA) are added, followed by 24.95 g of ethanol and appropriate amount of copper phthalocyanine (CuP) pigment stock dispersion in Tris to have 50 ppm of CuP in the lens formulation. After complete homogenization of the solution, this solution is filtered through a Teflon membrane having a pore width of 0.5 microns under nitrogen or air pressure. This solution is then pipetted into dust-free contact-lens moulds made from polypropylene. The molds are closed, and the polymerization reaction is effected by UV irradiation (5.0 mW/cm2, 30 min.), with simultaneous crosslinking. The molds are then opened in hot water. Lenses are removed from the open molds and extracted for 4 hours minimum with 100% isopropyl alcohol before being placed into water. The extracted lenses are subjected to plasma treatment according to procedures described in published US patent application No. 2002/0025389 to obtain plasma coatings. The plasma coating on lenses is determined to have a thickness of from about 20 nm to about 25 nm. The plasma-coating lenses are in dried state.

Example 3

This example describes the procedures for preparing solutions, dip coating, and in-package-crosslinking coating in each Example below. The plasma-coated silicone hydrogel (SiHy) contact lenses prepared in Example 2 are used in each example below.

PMAA Solution

Aqueous solutions of polymethyacrylic acid (PMAA) are prepared by dissolving an adequate amount of PMAA (Mw~1316K Daltons) in water (distilled or deionized water) and by adding an adequate amount of formic acid to adjust the solution pH to about 2.3 to about 2.8. The PMAA solution is heated to a temperature above room temperature, for example 40° C., when being used in the PMAA dip coating process.

Phosphate Buffer (PB)

A phosphate buffer (PB) is prepared by dissolving $NaH_2PO_4.H_2O$ and $Na_2HPO_4.2H_2O$ in a given volume of purified water (distilled or deionized) to have about 0.044 w/w % of $NaH_2PO_4.H_2O$ and about 0.388 w/w/% of $Na_2HPO_4.2H_2O$.

Phosphate Buffer Saline (PBS)

A phosphate buffer (PB) is prepared by dissolving $NaH_2PO_4.H_2O$, $Na_2HPO_4.2H_2O$ and NaCl in a given volume of purified water (distilled or deionized) to have about 0.044 w/w % of $NaH_2PO_4.H_2O$, about 0.388 w/w/% of $Na_2HPO_4.2H_2O$, and 0.79 w/w % of NaCl.

Preparation of Water-Soluble Thermally-Crosslinkable Materials

Water soluble thermally-crosslinkable material preparation is described in each example below.

In-Package-Crosslinking (IPC) Saline

Preparation of IPC saline is described in each example below. The pH of IPC saline is adjusted to about 7.4 by adding either 1N NaOH or 1N HCl if necessary. 5 ppm hydrogen peroxide maybe added to the final IPC saline to prevent bioburden growth and the IPC saline is filtered using a 0.22 micron membrane filter.

Production of SiHy Lenses with Composite Coating (Plasma Coating+Hydrogel Coating) Thereon Dried, plasma-coated SiHy lenses (prepared in Example 2) are placed in trays having wells each holding one SiHy lens. Then the trays with SiHy lenses are immersed in an aqueous solution of PMAA (at a concentration of from about 0.15% to about 0.5% by weight, as specified in each example below) at a specific temperature for a certain periods of time as specified in each example below. Adequate agitation (e.g. horizontal shaking or up-down movement) may be used to ensure appropriate flow of PMAA solution during the dip step. After PMAA dip coating, the lenses are transferred to a bath of water (distilled or deionized water) or phosphate buffer (PB) for 7 min. to 2 hours, usually at room temperature. Adequate agitation (e.g., horizontal shaking or up-down movement) may be used to ensure appropriate flow of water or PB during the dip step.

water bath and cool it down by putting it in room temperature water, obtained an aqueous solution including a water-soluble thermally-crosslinkable polymeric material. The pH of the aqueous solution is adjusted to about 7.4 by adding either 1N NaOH or 1N HCl if necessary to form the IPC Saline, IPC #1. 5 ppm hydrogen peroxide maybe added to the final IPC saline to prevent bioburden growth and the IPC saline is filtered using a 0.22 micron membrane filter.

Preparation of SiHy Lenses with a Composite Coating Thereon

SiHy lenses, each with a composite coating thereon, are produced using IPC #1 according to the procedures described in Example 3 under the coating conditions listed in Table 1 and autoclaved for 45 minutes.

Control lenses are obtained by placing plasma-coating lenses prepared in Example 2 in a phosphate buffered saline (about 0.044 w/w % $NaH_2PO_4.H_2O$, about 0.388 w/w % $Na_2HPO_4.2H_2O$, and about 0.79% w/wt % NaCl) in polypropylene lens packaging shells and sealing the blisters with foil, and then autoclaving the sealed blisters for 45 minutes at about 121° C. The modulus of control lenses is measured to be 1.14±0.02 MPa

TABLE 1

| | Coating Process Parameter | | | | | | |
|---|---|---|---|---|---|---|---|
| [PMAA] (wt %) | Coating Temperature (° C.) | Coating Time (min.) | Rinsing Time (min.) | Coating solution pH | IPC | OOP Friction Rating | Modulus |
| 0.5 | 40 | 90 | 7 | 2.3 | #1 | 0,0,0 | 1.16 ± 0.01 |
| 0.15 | 40 | 120 | 7 | 2.3 | #1 | 0,0,0 | 1.23 ± 0.02 |
| 0.15 | 40 | 120 | 7 | 2.3 | #1 | 1,1,1 | 1.19 ± 0.06 |

PMAA-coated SiHy lenses obtained above are placed in polypropylene lens packaging shells (or blisters) (one lens per shell) with 0.55 mL of the IPC saline (half of the saline is added prior to inserting the lens). The blisters are then sealed with foil and autoclaved for about 30-45 minutes (specified in each examples below) at about 121° C., forming SiHy contact lenses with a composite coating consisting of a plasma coating and a hydrogel top coating (PMAA-x-hydrophilic polymeric material) on top of the plasma coating.

Example 4

Preparation of IPC Saline (IPC #1)

A water-soluble thermally-crosslinkable polymeric material (i.e., "in-package-crosslinking agent" or "IPC agent") is prepared from polyamidoamine-epichlorohydrin (PAE) and poly(acrylamide-co-acrylic acid)(90/10) (i.e., poly(AAm-co-AA) 90/10 as follows. PAE solutions (Kymene) are purchased from Ashland as an aqueous solution and used as received. Poly(AAm-co-AA)(90/10) partial sodium salt, poly(AAm-co-AA) 90/10, Mw 200,000) is purchased from Polysciences, Inc. and used as received. The following components: 0.09 w/w % of PAE, 0.07 w/w % of poly (AAm-co-AA)(90/10), about 0.044 w/w % $NaH_2PO_4.H_2O$, about 0.388 w/w/% $Na_2HPO_4.2H_2O$, and about 0.79% w/wt % NaCl are dissolved in a target amount of purified water (distilled or deionized water) and then pH-adjusted by adding 1 N NaOH to desired pH (e.g., 7.4). The prepared solution is placed in a container immersed in a water bath. The reaction is carried out at about 65° C. for about 6 hours. Remove the container with the solution therein from the The friction rating of SiHy lenses with a composite coating thereon are evaluated according to the procedures described in Example 1 for out-of-package lenses (OOP). The results are reported in Table 1.

Results in Table 1 show that SiHy Lenses with a composite coating have a superior OOP lubricity (a friction rating of 0) comparing to control lenses (a friction rating of 4 for OOP).

The modulus of the SiHy lenses with a composite coating thereon are similar to the control lenses (within measurement uncertainty), indicating that the coating conditions is unlikely to cause the degradation of the lens material.

Example 5

Preparation of IPC Saline (IPC #2)

The IPC saline, IPC #2, is prepared according to the procedures described in Example 4, except that the concentrations of PAE and poly(AAm-co-AA)(90/10) are 0.116 w/w % and 0.131 w/w % respectively.

Preparation of SiHy Lenses with a Composite Coating Thereon

SiHy lenses, each with a composite coating thereon, are produced using IPC #2 according to the procedures described in Example 3 under the coating conditions listed in Table 2 and autoclaved for 45 minutes. Control lenses are obtained according to the procedures described in Example 4.

TABLE 2

| | Coating Process Parameter | | | | | Friction Rating | |
|---|---|---|---|---|---|---|---|
| [PMAA] (wt %) | PMAA-dip T (° C.) | PMAA-dip Time (min.) | Rinsing Time (min.) | PMAA sol. pH | IPC | OOP | 2x cycled |
| 0.15 | 40 | 120 | 7 | 2.5 | #2 | 0,0,0 | 2,2,2 |

Results in Table 2 show that SiHy Lenses with a composite coating have a superior lubricity for OOP (a friction rating of 0) and after 2× cycled (a friction rating of 2) comparing to control lenses (a friction rating of 4 for OOP and for 2× cycled).

Example 6

Preparation of IPC Saline (IPC #3)

An IPC agent is prepared from polyamidoamine-epichlorohydrin (PAE) and mono-thiol-terminated and monomethyl-terminated polyethylene glycol (i.e., mPEG-SH). The IPC saline, IPC #3, is prepared as following: (1) dissolve 18.2 w/w % PAE into 71.3 w/w % PBS (prepared in Example 3); (2) 7.5 w/w % sodium citrate dihydrate and 3 w/w % mPEG-SH are added to solution (the concentration of mPEG-SH and PAE are about 10 times of final IPC saline); (3) after stirring for about 5 min, pH of solution is adjusted to ~7.5 by adding 1N NaOH; (4) solution is then purged with $N_2$ (flow rate 0.1 SCFhr) for 1 hour usually at room temperature; (5) react the mixture in a water bath at 45° C. for 4 hours; (6) remove the mixture from water bath and cool down in a room temperature water bath; (7) dilute the mixture with PBS (10 times dilution) and adjust pH to 7.4; and (8) filter the mixture by 0.22 μm PES sterile filter unit.

Preparation of SiHy Lenses with a Composite Coating Thereon

SiHy lenses, each with a composite coating thereon, are produced using IPC #3 according to the procedures described in Example 3 under the coating conditions listed in Table 3 and autoclaved for 30 minutes. Control lenses are obtained according to the procedures described in Example 4.

Results in Table 3 show that SiHy Lenses with a composite coating have superior OOP and 2× cycled lubricity comparing to control lenses (a friction rating of 4 for OOP and for 2× cycled). Moreover, when investigating the coating intactness via Sudan Black (as described in Example 1), no surface staining nor fine lines is observed from out-of-pack, 2× cycled and 7× cycled lenses.

Example 7

Preparation of IPC Saline (IPC #4)

An IPC agent is prepared from polyamidoamine-epichlorohydrin (PAE) and poly[acrylamide-co-N-(3-Aminopropyl)methacrylamide](92/8 w/w) (i.e., PAAm-APMAm). PAAm-APMAm (92/8 w/w) is synthesized in-house (amine functionality ~0.44 meq/g, an aqueous solution with solid content 2.36%).

The IPC saline, #4, is prepared as following: (1) dissolve phosphate salts (~26 mM), 55.6 w/w % poly(AAm-co-APMAm), 4.80 w/w % PAE, and 39.58 w/w % PBS buffer (the concentration of poly(AAm-co-APMAm) and PAE are about 10 times of final saline); (2) adjust pH to ~9.0 by adding 1N NaOH; (3) react the mixture in a water bath at 70° C. for 3 hours; (4) remove the mixture from water bath and cool down in a room temperature water bath; (5) remove the mixture from water bath and cool down in a room temperature water bath; (6) dilute the mixture with PBS buffer (10 times dilution) and adjust pH to ~7.3; and (7) filter the mixture by 0.22 μm PES sterile filter unit.

Preparation of SiHy Lenses with a Composite Coating Thereon

SiHy lenses, each with a composite coating thereon, are produced using IPC #3 according to the procedures described in Example 3 under the coating conditions listed in Table 4 and autoclaved for 30 minutes. Control lenses are obtained according to the procedures described in Example 4.

TABLE 3

| | Coating Process Parameter | | | | | Friction Rating | | Coating Intactness | | |
|---|---|---|---|---|---|---|---|---|---|---|
| [PMAA] (wt %) | PMAA-dip T (° C.) | PMAA-dip Time (min.) | Rinsing Time (min.) | PMAA sol. pH | IPC | OOP | 2x cycled | OOP | 2x cycled | 7x cycled |
| 0.15 | 40 | 120 | 7 | 2.5 | #3 | 1, 1, 1 | 2, 2, 2 | No Staining | No Staining | No Staining |

TABLE 4

| [PMAA] (wt %) | PMAA-dip T (° C.) | PMAA-dip Time (min.) | Rinsing Time (min.) | PMAA sol. pH | IPC | Friction Rating OOP | 2x cycled |
|---|---|---|---|---|---|---|---|
| 0.15 | 40 | 120 | 120 | 2.5 | #4 | 0, 0, 0 | NA |
| 0.15 | 40 | 120 | 120 | 2.5 | #4 | 0, 0, 0 | 1, 1, 1 |

Results in Table 4 show that SiHy Lenses with a composite coating have superior OOP and 2× cycled lubricity comparing to control lenses (a friction rating of 4 for OOP).

What is claimed is:

1. A method for producing soft contact lenses, comprising the steps of:
   (1) treating a silicone hydrogel contact lens in dried state with a plasma generated in a plasma gas compose of a mixture of (a) a $C_1$-$C_6$ hydrocarbon and (b) a secondary gas selected from the group consisting of air, $N_2$, $O_2$, $CO_2$, and combinations thereof to obtain a plasma-treated silicone hydrogel contact lens in dried state, wherein the plasma-treated silicone hydrogel contact lens in dried state has a silicone hydrogel lens body and a plasma base coating thereon, wherein the silicone hydrogel lens body is the silicone hydrogel contact lens that is essentially made of a silicone hydrogel material, wherein the plasma base coating has a thickness of from about 0.5 nm to about 40 nm;
   (2) contacting the plasma-treated silicone hydrogel contact lens in dried state with a first aqueous coating solution including a poly(alkylacrylic acid)polymer at a coating temperature of from about 40° C. to about 50° C. for a contacting time of from about 60 minutes to about 300 minutes to form a soft contact lens precursor which has the plasma base coating and a layer of poly(alkylacrylic acid) on top of the plasma base coating on the silicone hydrogel lens body, wherein the first aqueous coating solution has a pH from 2.3 to 5.0 and the poly(alkylacrylic acid)polymer is a homopolymer or copolymer of methacrylic acid, ethyl acrylic acid or 2-(meth)acrylamidoglycolic acid, provided that the first aqueous coating solution includes one or more non-polymeric acids in a total amount for having an acid-induced change in elastic modulus, ΔE, of not greater than 15%, wherein $$\Delta E = \left| \frac{E_i - E_0}{E_0} \right| \times 100\%$$

in which $E_i$ is the elastic modulus of the plasma-treated silicone hydrogel contact lens after being in contact with the first aqueous coating solution at the coating temperature for the contacting time and $E_o$ is the elastic modulus of the plasma-treated silicone hydrogel contact lens prior to contacting with the first aqueous coating solution; and
   (3) heating the soft contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the poly(alkylacrylic acid) polymer so as to form the soft contact lens with the composite coating thereon, wherein the composite coating comprise the plasma base coating and a hydrogel coating on top of the plasma base coating,
   wherein the soft contact lens in fully hydrated state has a friction rating of about 3 or lower after 7 cycles of manual rubbing test.

2. The method of claim 1, wherein the poly(alkylacrylic acid) has a weight average molecular weight of at least 100,000 Daltons.

3. The method of claim 2, wherein the step of heating is performed by autoclaving the soft contact lens precursor immersed in the second aqueous coating solution in a sealed lens package at a temperature of from about 115° C. to about 125° C. for approximately 20-90 minutes, wherein the second aqueous coating solution is a buffered aqueous solution with a pH of from 6.7 to 7.6.

4. The method of claim 3, wherein the water-soluble thermally-crosslinkable polymeric material comprises
   (i) from about 20% to about 95% by weight of first polymer chains derived from a polyamidoamine-epichlorohydrin or a poly(2-oxazoline-co-ethylene-imine)-epichlorohydrin or a combination thereof,
   (ii) from about 5% to about 80% by weight of hydrophilic moieties and/or second polymer chains,
      wherein each of the hydrophilic moieties is derived from at least one first hydrophilicity-enhancing agent having at least one reactive functional group selected from the group consisting of primary amino group, secondary amino group, carboxyl group, thiol group, and combination thereof, wherein the hydrophilic moieties are covalently attached to the first polymer chains through one or more covalent linkages each formed between one azetidinium group of the polyamidoamine-epichlorohydrin and one primary or secondary amino, carboxyl or thiol group of the first hydrophilicity-enhancing agent,
      wherein each of the second polymer chains is derived from at least one second hydrophilicity-enhancing agent having at least one reactive functional group selected from the group consisting of primary amino group, secondary amino group, carboxyl group, thiol group, and combination thereof, wherein the second polymer chains are covalently attached to the first polymer chains through one or more covalent linkages each formed between one azetidinium group of the polyamidoamine-epichlorohydrin and one primary or secondary amino, carboxyl or thiol group of the second hydrophilicity-enhancing agent, and
   (iii) azetidinium groups which are parts of the first polymer chains or pendant or terminal groups covalently attached to the first polymer chains.

5. The method of claim 4, wherein the second hydrophilicity-enhancing agent is: a polyethylene glycol having one sole primary or secondary amino, carboxyl or thiol group; a polyethylene glycol with two terminal primary or secondary amino, carboxyl and/or thiol groups; a multi-arm polyethylene glycol with one or more primary or secondary amino, carboxyl and/or thiol groups; a polyethylene glycol dendrimer with one or more primary or secondary amino, carboxyl and/or thiol groups; or a copolymer which is a polymerization product of a composition comprising (1) about 60% or less by weight of one or more reactive vinylic monomers and (2) one or more non-reactive hydrophilic vinylic monomers, wherein said one or more reactive vinylic monomers are vinylic monomers having a carboxyl group, a primary amino group, or a secondary amino group, wherein said one or more non-reactive vinylic monomers are selected from the group consisting of a phosphorylcholine-containing vinylic monomer, (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof.

* * * * *